United States Patent
Nishioka et al.

(10) Patent No.: US 9,832,279 B2
(45) Date of Patent: Nov. 28, 2017

(54) STATION, TARGET APPARATUS, INITIATOR APPARATUS, COMMUNICATION SYSTEM, AND COMMUNICATION METHOD

(75) Inventors: Shinichiro Nishioka, Osaka (JP); Yuusaku Ohta, Osaka (JP); Kozo Nishimura, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 630 days.

(21) Appl. No.: 13/985,999

(22) PCT Filed: Mar. 9, 2012

(86) PCT No.: PCT/JP2012/001623
§ 371 (c)(1),
(2), (4) Date: Aug. 16, 2013

(87) PCT Pub. No.: WO2012/127803
PCT Pub. Date: Sep. 27, 2012

(65) Prior Publication Data
US 2013/0332504 A1   Dec. 12, 2013

(30) Foreign Application Priority Data
Mar. 23, 2011 (JP) ................................. 2011-064749

(51) Int. Cl.
G06F 15/16 (2006.01)
H04L 29/08 (2006.01)
(Continued)

(52) U.S. Cl.
CPC ........ *H04L 67/288* (2013.01); *H04L 41/0846* (2013.01); *H04L 41/0853* (2013.01); *H04L 67/2842* (2013.01); *H04N 21/6371* (2013.01)

(58) Field of Classification Search
CPC .......................... H04L 41/0853; H04L 67/288
(Continued)

(56) References Cited

U.S. PATENT DOCUMENTS

| 4,590,468 A * | 5/1986 | Stieglitz ................ H04L 12/417 370/450 |
| 5,430,843 A * | 7/1995 | Sato ...................... H04L 12/417 370/458 |

(Continued)

FOREIGN PATENT DOCUMENTS

| CN | 101146017 A | 3/2008 |
| CN | 101808050 A | 8/2010 |

(Continued)

OTHER PUBLICATIONS

International Search Report dated Apr. 17, 2012 in corresponding International Application No. PCT/JP2012/001623.
(Continued)

*Primary Examiner* — Jason Recek
(74) *Attorney, Agent, or Firm* — Wenderoth, Lind & Ponack, L.L.P.

(57) ABSTRACT

A plurality of networks each having a host are connected to achieve a transparent transaction between devices belonging to the different networks. A target apparatus includes a station and a host. In response to a get device handle request from an initiator apparatus, the station acquires, from the host, configuration information of a target device and relays transactions between the initiator apparatus and the target device, without requiring involvement of the host.

13 Claims, 22 Drawing Sheets

(51) Int. Cl.
*H04L 12/24* (2006.01)
*H04N 21/6371* (2011.01)

(58) Field of Classification Search
USPC .......................................................... 709/201
See application file for complete search history.

(56) References Cited

U.S. PATENT DOCUMENTS

| | | | |
|---|---|---|---|
| 6,760,333 B1* | 7/2004 | Moody | H04L 12/403 370/395.1 |
| 7,680,905 B1 | 3/2010 | Roberts et al. | |
| 8,406,246 B2* | 3/2013 | Beshai | H04Q 11/0066 370/425 |
| 2007/0147365 A1* | 6/2007 | Iwayama | H04L 12/1813 370/389 |
| 2008/0063001 A1 | 3/2008 | Tanimoto | |
| 2009/0157866 A1* | 6/2009 | Sridharan | H04L 69/163 709/224 |
| 2009/0182870 A1 | 7/2009 | Hirsch | |
| 2010/0208734 A1 | 8/2010 | Shiba et al. | |
| 2012/0124357 A1* | 5/2012 | Zimmer | G06F 1/3203 713/2 |

FOREIGN PATENT DOCUMENTS

| | | |
|---|---|---|
| EP | 1 942 634 A1 | 7/2008 |
| JP | 2000-115173 | 4/2000 |
| JP | 2005-242411 | 9/2005 |
| JP | 2007-518160 | 7/2007 |
| WO | 2005/062248 | 7/2005 |

OTHER PUBLICATIONS

"Wireless Universal Serial Bus Specification 1.1", [online], USB Implementers Forum, Inc. (Nov. 16, 2010) <URL:http://www.usb.org/developers/wusb/docs/wusb1_1_20100910.zip>, Revision 1.1, Sep. 9, 2010.

IEEE Standard for Information technology—Telecommunications and information exchange between systems—Local and metropolitan area networks—Specific requirements, "Part 11: Wireless LAN Medium Access Control (MAC) and Physical Layer (PHY) Specifications", [Online], IEEE Std 802.11™-2007 (Revision of IEEE Std 802.11-1999), URL:http://standards.Ieee.org/getieee802/download/802.11-2007.pdf, Jun. 12, 2007.

"Eye-Fi Connect X2", [online], Eye-Fi, (Nov. 16, 2010) <URL:http://www.Eye.fi/products/connectx2>.

IEEE Standard for Information technology—Telecommunications and information exchange between systems—Local and Metropolitan area networks—Specific requirements, "Part 15.3: Wireless Medium Access Control (MAC) and Physical Layer (PHY) Specifications for High Rate Wireless Personal Area Networks (WPANs)", Amendment 2: Millimeter-wave-based Alternative Physical Layer Extension, IEEE Std 802.15.3c™-2009 (Amendment to IEEE Std 802.15.3™-2003), Oct. 12, 2009.

Wireless Gigabit Alliance, "WiGig White Paper Defining the Future of Multi-Gigabit Wireless Communications", Jul. 2010.

Office Action dated Jul. 13, 2015 in Chinese Application No. 201280010130.2 (with English translation of Search Report).

Extended European Search Report dated Oct. 7, 2014 in corresponding European Application No. 12761345.3.

Series X: Data Networks and Open System Communication, OSI management—Management Communication Service and Protocol, "Information technology—Open Systems Interconnection—Common Management Information service", ITU-T Recommendation X.710, Jan. 10, 1997, pp. 1-38, XP002259466.

"Digital cellular telecommunications system (Phase 2+); Network Management (NM) Procedures and messages on the A-bis interface (3GPP TS 52.021 version 7.0.0 Release 7)", ETSI TS 152 021, IEEE Lis, Sophia Antipolis Cedex, France, vol. 3-G3, No. V7.0.0, Oct. 1, 2007, XP014040365.

"Digital cellular telecommunication system (Phase 2); Interworking of GSM Network Management (NM) procedures and messages at the Base Station Controller (BSC) (GSM 12.22)"; European Telecommunications Standards Institute (ETSI), 650, Route Des Lucioles; F-06921 Sophia-Antipolis; France, vol. zArchive, May 28, 1998, pp. 1-68, XP014112128.

* cited by examiner

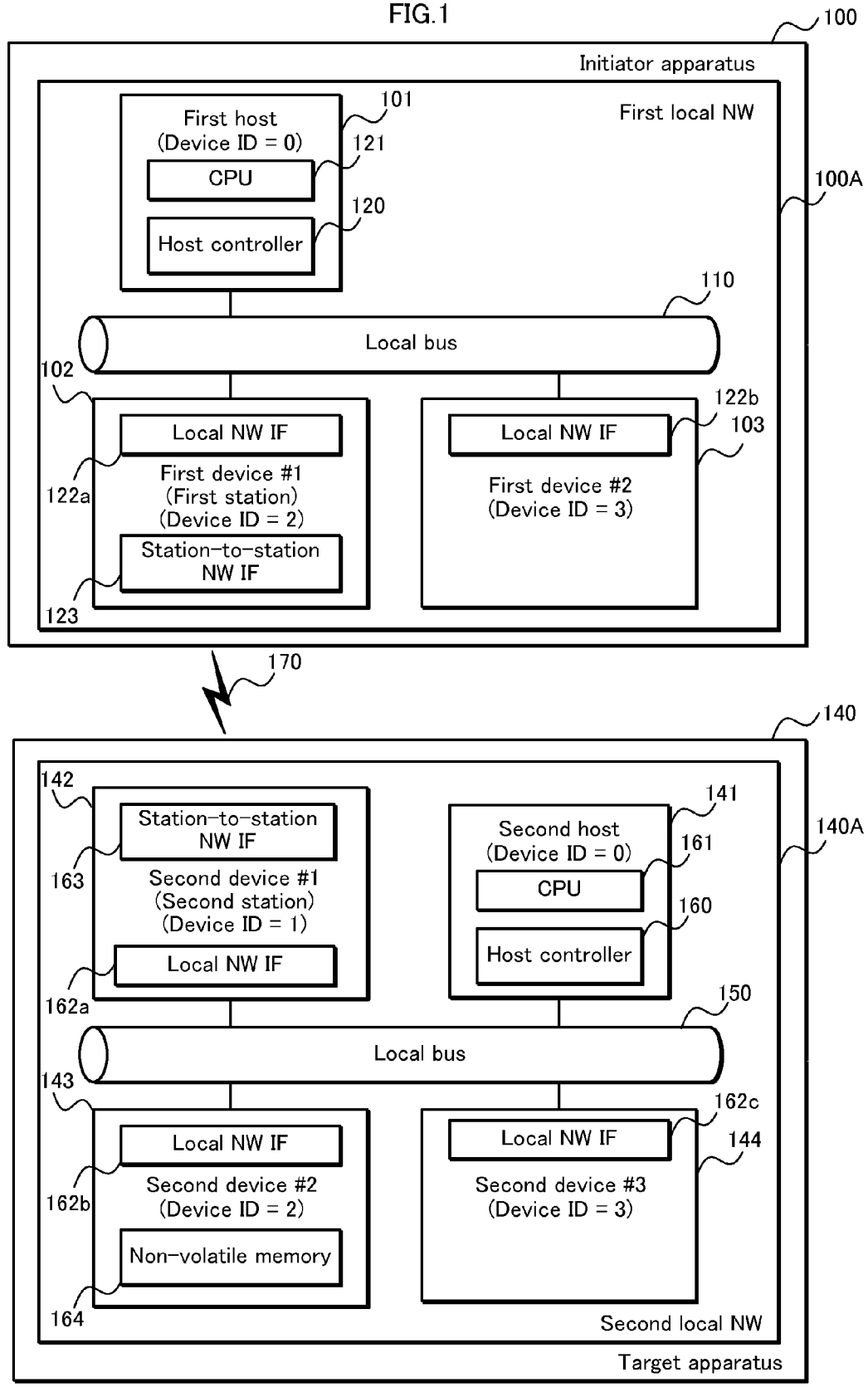

FIG.5A

| Capability field | Size (Byte) | Description |
|---|---|---|
| Device type | 1 | Device type code |
| Device protocol | 1 | Device protocol code |
| Max buffer size | 3 | Maximum buffer size |

FIG.5B

| Setting field | Size (Byte) | Description |
|---|---|---|
| Device ID | 1 | Device ID |
| Max packet size | 2 | Maximum packet size |
| Max burst num | 1 | Maximum number of packets per burst |

FIG.7A  Control command (CCMD)
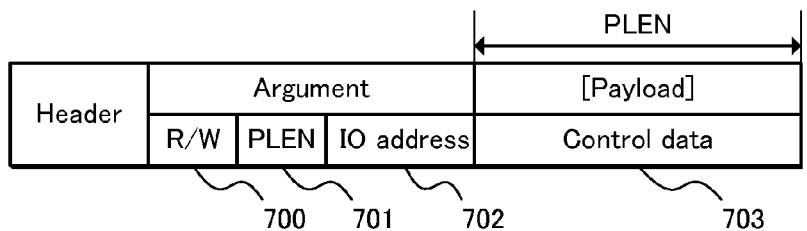
FIG.7B  Data coomand (DCMD)
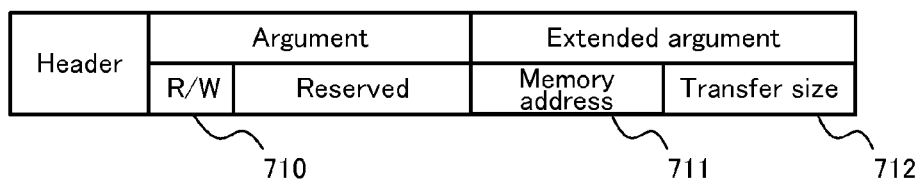
FIG.7C  Response (RES)
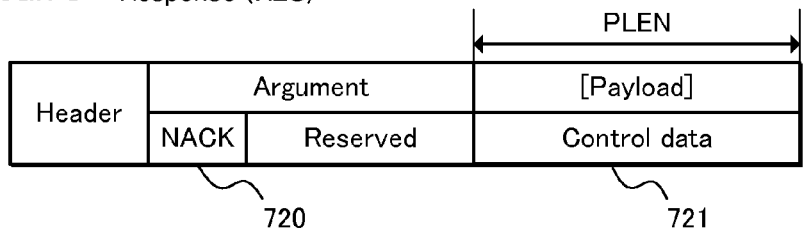
FIG.7D  Data
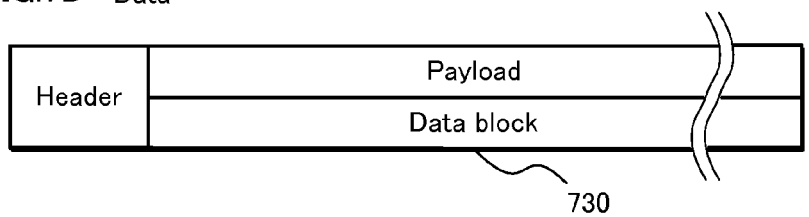
FIG.7E  Message
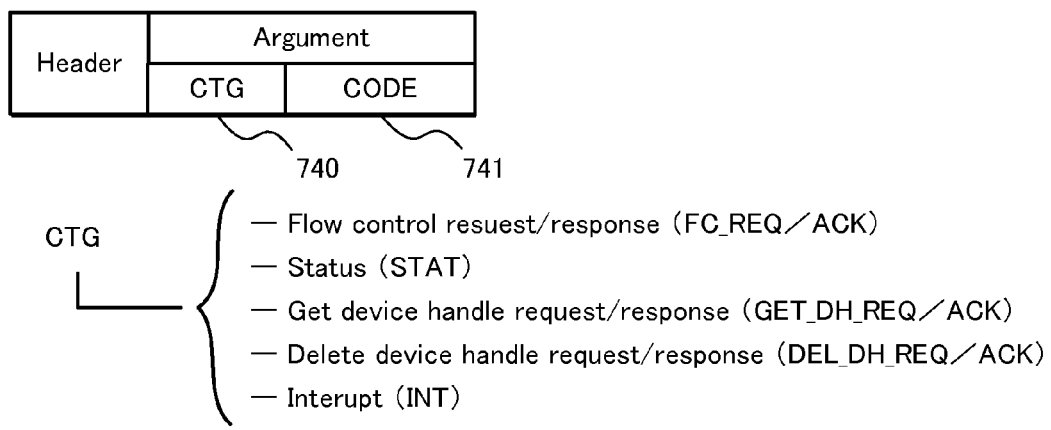

FIG.20

| Device ID = 1 | Device type = Wireless IO |
|---|---|
| Device ID = 2 | Device type = Memory |
| Device ID = 3 | Device type = Generic IO |
| ... | ... |

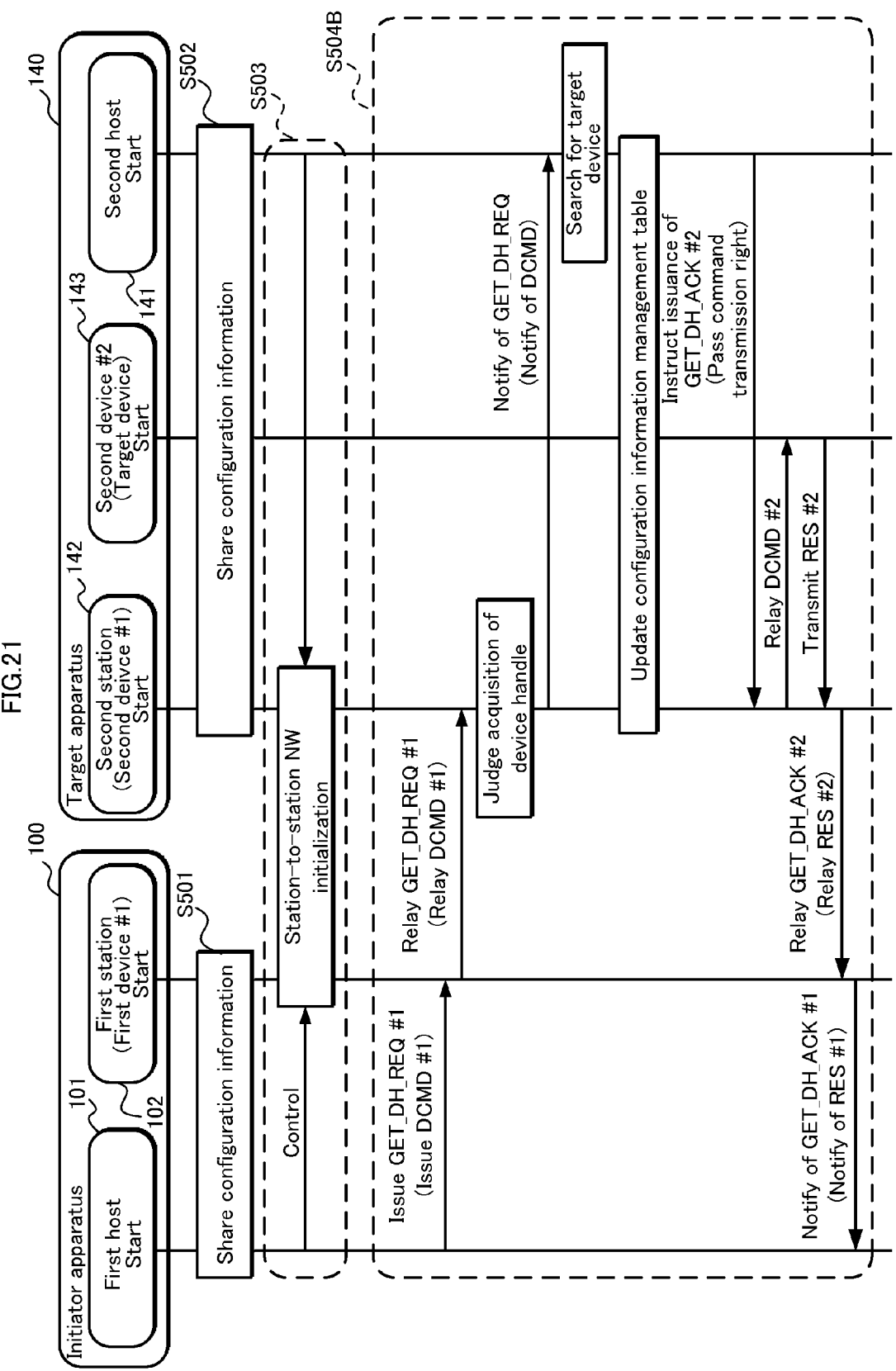

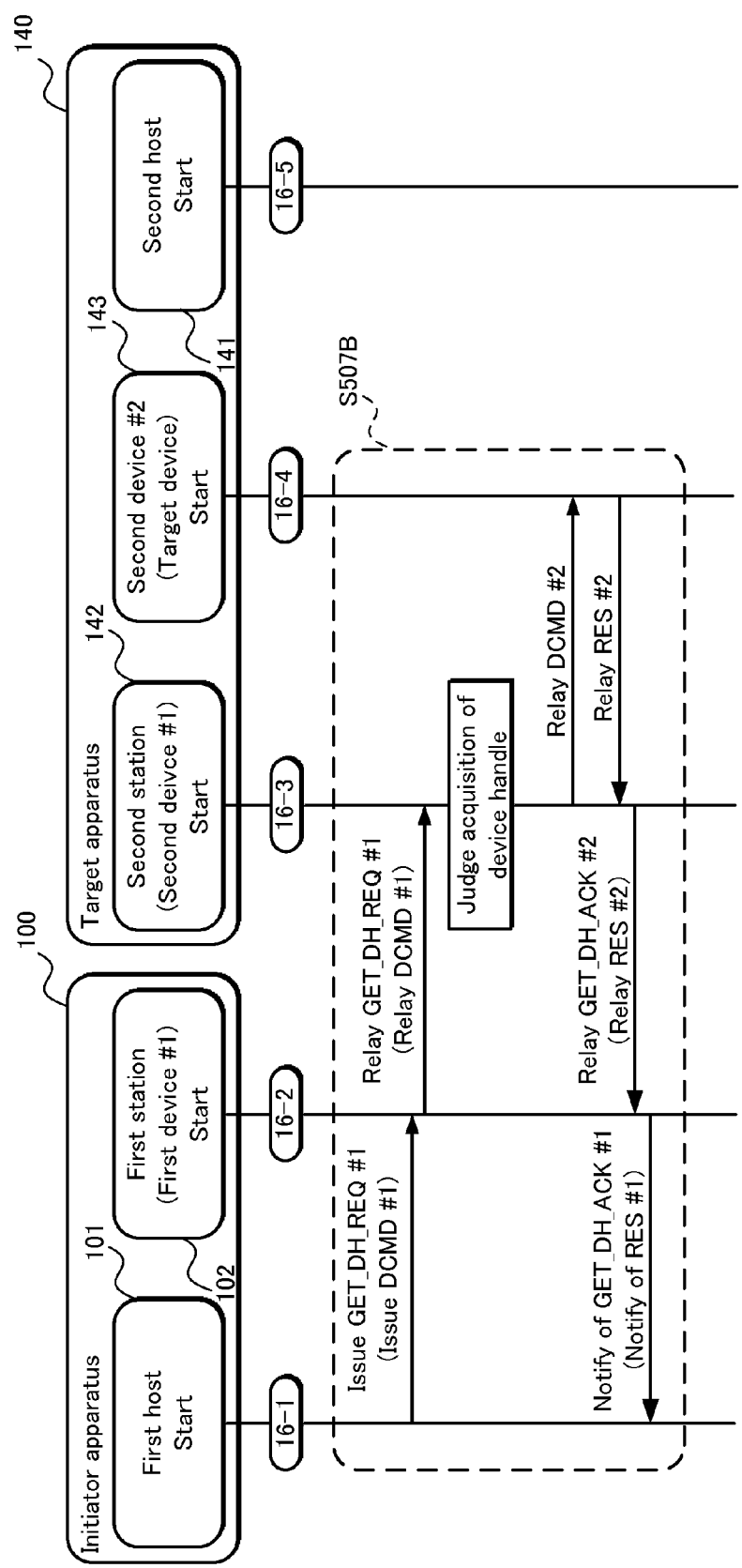

STATION, TARGET APPARATUS, INITIATOR APPARATUS, COMMUNICATION SYSTEM, AND COMMUNICATION METHOD

TECHNICAL FIELD

The present invention relates to technologies for connecting local networks each having a host and performing communications between the host of one local network and a device of another local network.

BACKGROUND ART

Conventionally, it is common that a massive amount of content is transferred at offices and homes among personal computers (PCs), mobile phones, and various AV devices typified by digital still cameras and BD recorders. Usually, transfer of content between AV devices is carried out with the use of a personal area network (PAN) employing wired communications such as the universal serial bus (USB) or with the use of bridge media such as SD memory card. However, use of the USB or SD memory card requires cable connection or insertion/withdrawal of the SD card. Therefore, there is a demand for wireless connection from the standpoint of device usability. For example, wireless USB according to which the physical layers are unwired has already been standardized and its specifications are publically available at the URL listed as Non-Patent Literature 1 below. Regarding bridge media such as SD memory card, products implementing a wireless local area network (LAN) compliant with IEEE 802.11 standards (see Non-Patent Literature 2) are already in use (see Non-Patent Literature 3).

From another standpoint of improved device usability, wireless communications are requested to achieve the speed comparable to wired communications in order to reduce communication latency for users. To meet the request, wireless PAN technologies using 60 GHz millimeter-waves have been standardized as a future replacement for wired PAN applications exceeding 1 Gbps offered by USB 3.0, for example. Specifically speaking, the standardization has been developed by IEEE 802.15.3C and Wireless Gigabit (WiGig) Alliance. Especially, the WiGig Alliance has defined an extended MAC layer that is backward compatible with the existing MAC layer compliant with the IEEE 802.11 standards. The WiGig Alliance is also developing, as an upper layer of the extended MAC layer, the IO-protocol adaptation layer (PAL) specifications for adaptation of IO bus protocols, such as USB and PCI Express. Since the architecture as described above will facilitate wireless connection that uses the existing IO bus protocols, the standardization of high-speed wireless communications is waited in expectation.

As one known technology for network extension by using wireless connection, Patent Literature 1 discloses a technology according to which each wireless node connected to a wired network collects and stores information about other nodes and provides the information to a wireless device being at the other end of the connection. This technology allows the user of the wireless device to search for and access content held in the storage connected to the wired network, without having to be aware of the physical connection. In this way, in wireless connection between a wireless device and a wireless node, the use of protocols adapted for wired networks, such as IO-PAL described above, reduces the overhead of protocol conversion and thus enables high-speed communications.

CITATION LIST

Patent Literature

[Patent Literature 1]
Japanese Patent Application Publication No. 2000-115173

Non-Patent Literature

[Non-Patent Literature 1]
"Wireless Universal Serial Bus Specification Revision 1.1". [Online]. USB Implementers Forum, Inc. [Retrieved Nov. 16, 2010.]
[Non-Patent Literature 2]
"IEEE Std 802.11-2007, Part 11: Wireless LAN Medium Access Control (MAC) and Physical Layer (PHY) Specifications". [Online]. IEEE Standard. [Retrieved Nov. 16, 2010.]
[Non-Patent Literature 3]
"Eye-Fi Connect X2". [Online], Eye-Fi. [Retrieved Nov. 16, 2010.]

SUMMARY OF INVENTION

Technical Problem

Unfortunately, the conventional technologies give a rise to the following problem when applied to a wired network with a logical star topology in which a host is at the center, like USB or the SD bus in an SD memory card (or SDIO). For example, when a wireless node is a device connected to a wired network, a wireless apparatus cannot access to any device in the wired network directly via the wireless node. In such a case, the wireless node needs to notify the host of the wired network of an access request received from the wireless apparatus, and the requested access to the device can only be made via the host. Consequently, the communication speed slows down significantly.

The present invention aims to increase the communication speed of transactions between a remote network and a device in a local network.

Solution to Problem

In order to solve the above-described problems associated with the conventional technology, a station according to a first aspect of the present invention is included in a local network including a host and is for relaying communications transmitted to and from another local network. The station includes: a configuration information sharing unit configured to share configuration information of the station with the host, the configuration information being for use in the local network; a device handle control unit configured to, in response to a get device handle request received from the other local network, acquire configuration information of a target device from the host, the target device being one of devices belonging to the local network, and return a get device handle response that is a response to the get device handle request to the other local network; and a transaction relay unit configured to relay a command received from the other network and a transaction specified by the command to the target device. The relay of the transaction by the transaction relay unit is carried out based on the configuration information of the target device acquired by the device handle control unit and without involvement of the host.

With the above-described aspect, the station is enabled to relay the transaction between the target device and the other local network without the intermediary of the host, thereby increasing the communication speed as compared with a transaction involving the host.

According to a second aspect, the station of the first aspect may further include a configuration information management table. The device handle control unit may be configured to: acquire the configuration information of the target device from the host by transmitting to the host a notification indicating receipt of the get device handle request; and store the thus acquired configuration information of the target device into the configuration information management table. The get handle response may include a result flag indicating whether or not the configuration information of the target device has been successfully acquired.

With the above-described aspect, the station is enabled to acquire the configuration information of the target device from the host. The configuration information is necessary for the station to relay the transaction. In addition, the inclusion of the result flag in the get device handle response allows the other local network to confirm whether or not logical connection between the other local network and the target device included in the local network has been successfully established.

According to a third aspect, in the station of the second aspect, the device handle control unit may be configured to: in response to a delete device handle request received from the other local network, transmit a notification indicating receipt of the delete device handle request to the host and invalidate the configuration information of the target device stored in the configuration information management table; and return a delete device handle response that is a response to the delete device handle request to the other local network.

With respect to the above-described aspect, the station is enabled to disconnect the logical connection between the other local network and the target device included in the local network.

According to a fourth aspect, in the station of the second aspect, each of the get device handle request and the notification indicating receipt of the get device handle request may include a device handle number for identifying the target device. The device handle control unit may be configured to store into the configuration information management table the configuration information of the target device in association with the device handle number. The configuration information stored herein has been received from the host in response to the notification indicating receipt of the get device handle request and thus corresponding to the device handle number.

With respect to the above-described aspect, the station is enabled to identify the target device by using the device handle number between the local network and the other local network.

According to a fifth aspect, in the station of the fourth aspect, the device handle control unit may be configured to transmit the notification indicating receipt of the get device handle request to the host, only when the configuration information management table does not store the configuration information of the target device corresponding to the device handle number that is included in the received get device handle request.

With respect to the above-described aspect, the station is enabled to reduce the frequency of issuing to the host the notification indicating reception of the get device handle request.

According to a sixth aspect, in the station of the second aspect, the device handle control unit may be configured to: collectively acquire respective pieces of configuration information of devices of a target device group from the host in response to the notification indicating receipt of the get device handle request; and collectively store the respective pieces of configuration information of the devices of the target device group into the configuration information management table.

With respect to the above-described aspect, the station is enabled collectively acquire the respective pieces of configuration information of the devices belonging to the target device group, in advance of relaying the transaction.

According to a seventh aspect, in the station of the sixth aspect, the get device handle response may include information specifying each device of the target device group.

With respect to the above-described aspect, the station is enabled to notify the other local network of the information identifying each device belonging to the target device group, by transmitting the get device handle response in response to the get device handle request.

According to an eighth aspect, in the station of the seventh aspect, the get device handle response may further include a device type code for each device of the target device group, each device type code identifying a device type of the corresponding device.

With respect to the above-described aspect, the station is enabled to notify the other local network of the device type code of each device belonging to the target device group, by transmitting the get device handle response. Consequently, with reference to the get device handle response, the other local network is enabled to confirm the device type code of each device belonging to the target device group.

According to a ninth aspect, in the station of the second aspect, each of the get device handle request and the notification indicating receipt of the get device handle request may include a device type code identifying a device type. The device handle control unit may be configured to acquire configuration information of each device corresponding to the device type from the host in response to the get device handle request and stores the configuration information of each device into the configuration information management table.

With respect to the above-described aspect, the station is enabled to relay the transaction to and from the target device corresponding to the device type specified by the other local network.

According to a tenth aspect, in the station of the first aspect, the device handle control unit may be configured to receive, as the get device handle request, a command from the other local network and transmit, as the get device handle response, a response to the command to the other local network. The transaction relay unit may be configured to relay a data transfer to and from the target device, a connection for the data transfer having been established with the other local network by handshaking using the command and the response.

With respect to the above-described aspect, the need for the station to exchange a dedicated get device handle request and a dedicated get device handle response with the other local network. Consequently, the data traffic between the station and the other local network is reduced.

According to an eleventh aspect, in the station of the tenth aspect, all packets for each of the command, the response, and the data transfer may include a tag ID for associating the command, the response, and the data transfer with one another. The device handle control unit may be configured to receive, as the device handle number, the tag ID included in the command.

The above-described aspect eliminates the need for the station to process the field added to the command for carrying the device handle number.

According to a twelfth aspect, the station of the second aspect may further include a memory unit configured for the station to operate as a memory device connected to the local network. The configuration information sharing unit may be configured to share two pieces of configuration information with the host, one of which is the configuration information of the station and the other of which is configuration information of the station that operates as the memory device. When the target device is the station that operates as the memory device, the transaction relay unit may relay the transaction to and from the memory unit based on the configuration information of the station that operates as the memory device.

With respect to the above-described aspect, the station is enabled to designate the memory unit integrated in the station as the target device and thus to relay, to the memory unit, the transaction to and from the other network.

A target apparatus according to a first aspect of the present invention has a local network that includes a host and one or more devices, one of which is a station, and the target apparatus is for communicating with an initiator apparatus via the station. The host is configured to share configuration information of the station with the station, the configuration information being for use in the local network. Each of the devices includes a configuration information sharing unit configured to share with the host the configuration information of the device, each piece of configuration information being for use in the local network. The one device being the station further includes: a device handle control unit configured to, in response to a get device handle request received from the initiator apparatus, acquire the configuration information of a target device from the host, the target device being one of the devices included in the local network, and the configuration information being for use in the local network, and return a get device handle response that is a response to the get device handle request to the initiator apparatus; and a transaction relay unit configured to relay a command received from the initiator apparatus and a transaction specified by the command to the target device. The relay of the transaction by the transaction relay unit is carried out based on the configuration information of the target device acquired by the device handle control unit and without involvement of the host.

With respect to the above-described aspect, the station is enabled to relay the transaction between the target device and the initiator apparatus without the intermediary of the host, thereby increasing the communication speed as compared with a transaction involving the host.

According to a second aspect, in the target apparatus of the first aspect, each piece of configuration information may include a maximum buffer size and a maximum burst size. The host may be configured to acquire a buffer size of the station and determine the maximum burst size to be used in communications between the station and each of the devices within a range not exceeding the thus acquired buffer size.

With respect to the above-described aspect, the station is enabled to prevent buffer overflows between the station and the target device when relaying the transaction between the initiator apparatus and the target device.

According to a third aspect, in the target apparatus of the first aspect, the station may further include a configuration information management table. The device handle control unit may be configured to: acquire the configuration information of the target device from the host by transmitting to the host a notification indicating receipt of the get device handle request; and store the thus acquired configuration information of the target device into the configuration information management table. The get handle response may include a result flag indicating whether or not the configuration information of the target device has been successfully acquired.

With respect to the above-described aspect, the station is enabled to acquire the configuration information of the target device from the host. The configuration information is necessary for the station to relay the transaction. In addition, the initiator apparatus is allowed to confirm whether or not the logical connection between the initiator apparatus and the target device has been successfully established, by checking the result flag included in the get device handle response.

According to a fourth aspect, in the target apparatus of the third aspect, the device handle control unit may be configured to: in response to a delete device handle request received from the initiator apparatus, transmit to the host a notification indicating receipt of the delete device handle request and invalidate the configuration information of the target device stored in the configuration information management table; and return a delete device handle response that is a response to the delete device handle request to the initiator apparatus.

With respect to the above-described aspect, the target apparatus is enabled to disconnect the logical connection between the initiator apparatus and the target device that in included in the local network.

According to a fifth aspect, in the target apparatus of the fourth aspect, the host is configured to: hand over a command transmission right to the station in response to the notification indicating receipt of the get device handle request, the command transmission right being a right to transmit commands to the target device in the local network; and retrieve the command transmission right from the station in response to the notification indicating receipt of the delete device handle request.

With respect to the above-described aspect, the target apparatus is enabled to prevent access contention to the target device between the host and the station that substitutes for the host.

According to a sixth aspect, in the target apparatus of the fifth aspect, the host may be configured to: switch on a hub employed to form the local network from a port for connection with the host to a port for connection with the station, in order to hand over the command transmission right to the station; and switch the port on the hub back to the original state, in order to retrieve the command transmission right from the station.

With respect to the above-described aspect, the station is enabled to physically substitute for the host, in the case where the local network is formed with a hub.

According to a seventh aspect, in the target apparatus of the third aspect, each of the get device handle request and the notification indicating receipt of the get device handle request may include a device handle number for identifying the target device. The device handle control unit may be configured to store into the configuration information management table the configuration information of the target device in association with the device handle number, the configuration information having been received from the host in response to the notification indicating receipt of the get device handle request and thus corresponding to the device handle number.

With respect to the above-described aspect, the target apparatus is enabled to identify the target device by using the device handle number between the target apparatus and the initiator apparatus.

According to an eighth aspect, in the target apparatus of the seventh aspect, the device handle control unit may be configured to transmit the notification indicating receipt of the get device handle request to the host, only when the configuration information management table does not store the configuration information of the target device corresponding to the device handle number that is included in the received get device handle request.

With respect to the above-described aspect, the station is enabled to reduce the frequency of issuing to the host the notification indicating reception of the get device handle request.

According to a ninth aspect, in the target apparatus of the third aspect, the device handle control unit may be configured to: collectively acquire respective pieces of configuration information of devices of a target device group from the host in response to the notification indicating receipt of the get device handle request; and collectively store the respective pieces of configuration information of the devices of the target device group into the configuration information management table.

With respect to the above-described aspect, the station is enabled collectively acquire the respective pieces of configuration information of the devices belonging to the target device group, in advance of relaying the transaction.

According to a tenth aspect, in the target apparatus of the ninth aspect, the get device handle response may include information specifying each device of the target device group.

With respect to the above-described aspect, the target apparatus is enabled to notify the initiator apparatus of the information identifying each device belonging to the target device group, by transmitting the get device handle response in response to the get device handle request.

According to an eleventh aspect, in the target apparatus of the tenth aspect, the get device handle response may further include a device type code for each device of the target device group, each device type code identifying a device type of the corresponding device.

With respect to the above-described aspect, the target apparatus is enabled to notify the initiator apparatus of the device type code of each device belonging to the target device group, by transmitting the get device handle response. Consequently, with reference to the get device handle response, the initiator apparatus is enabled to confirm the device type code of each device belonging to the target device group.

According to a twelfth aspect, in the target apparatus of the third aspect, each of the get device handle request and the notification indicating receipt of the get device handle request may include a device type code identifying a device type. The device handle control unit may be configured to acquire configuration information of each device corresponding to the device type from the host in response to the get device handle request and stores the configuration information of each device into the configuration information management table.

With respect to the above-described aspect, the station is enabled to relay the transaction to and from the target device corresponding to the device type specified by the initiator apparatus.

According to a thirteenth aspect, in the target apparatus of the first aspect, the device handle control unit may be configured to receive, as the get device handle request, a command from the initiator apparatus and transmit, as the get device handle response, a response to the command to the initiator apparatus. The transaction relay unit may be configured to relay a data transfer to and from the target device, a connection for the data transfer having been established with the initiator apparatus by handshaking using the command and the response.

With respect to the above-described aspect, the need for the target apparatus to exchange a dedicated get device handle request and a dedicated get device handle response with the initiator apparatus. Consequently, the data traffic between the target apparatus and the initiator apparatus is reduced.

According to a fourteenth aspect, in the target apparatus of the thirteenth aspect, all packets for each of the command, the response, and the data transfer may include a tag ID for associating the command, the response, and the data transfer with one another. The device handle control unit may be configured to receive, as the device handle number, the tag ID included in the command.

The above-described aspect eliminates the need for the target apparatus to process the field added to the command or response for carrying the device handle number.

According to a fifteenth aspect, in the target apparatus of the third aspect, the station may further include a memory unit configured for the station to operate as a memory device connected to the local network. The configuration information sharing unit may be configured to share two pieces of configuration information with the host, one of which is the configuration information of the station and the other of which is configuration information of the station that operates as the memory device. When the target device is the station that operates as the memory device, the transaction relay unit may relay the transaction to and from the memory unit based on the configuration information of the station that operates as the memory device.

With respect to the above-described aspect, the station is enabled to designate the memory unit integrated in the station as the target device and thus to relay the transaction to and from the initiator apparatus to the memory unit.

An initiator apparatus according to a first aspect of the present invention has a local network that includes a host and a station and is for communicating with a target apparatus via the station. The host is configured to share configuration information of the station with the station, the configuration information being for use in the local network. The station includes: a configuration information sharing unit configured to share configuration information of the station in the local network with the host; a device handle control unit configured to transmit a get device handle request to a target device that is included in the target apparatus, the get device handle request being for establishing logical connection with the target device, and to receive a get device handle response that is a response to the get device handle request from the target apparatus; and a transaction relay unit configured to relay, to the target apparatus, a command transmitted by the host for communicating with the target device that is included in the target apparatus and a transaction specified by the command.

With respect to the above-described aspect, the initiator apparatus enables the station to substitute for the target device and to relay the transaction between the host and the target device.

According to a second aspect, in the initiator apparatus of the first aspect, the device handle control unit is configured to: transmit to the target apparatus a delete device handle request for disconnecting the logical connection with the target device that is included in the target apparatus; and receive from the target apparatus a delete device handle response that is a response to the delete device handle request.

With respect to the above-described aspect, the initiator apparatus is enabled to request the target apparatus to disconnect the logical connection with the target device and to confirm that the disconnection.

According to a third aspect, in the initiator apparatus of the first aspect, the get device handle request may include a device handle number for identifying the target device. The get device handle response may include a result flag indicating whether or not the logical connection with the target device has been successfully established. The host may be configured to transmit the command only when the result flag indicates success.

With respect to the above-described aspect, the target apparatus is enabled to identify the target device by using the device handle number between the initiator apparatus and the target apparatus.

According to a fourth aspect, in the initiator apparatus of the first aspect, the host may be configured to transmit a command as the get device handle request and receive the command as the get device handle response. The transaction relay unit may be configured to relay a data transfer to and from the target apparatus, a connection for the data transfer having been established with the target apparatus by handshaking using the command and the response.

With respect to the above-described aspect, the need for the initiator apparatus to exchange a dedicated get device handle request and a dedicated get device handle response with the target apparatus. Consequently, the data traffic between the initiator apparatus and the target apparatus is reduced.

According to a fifth aspect, in the initiator apparatus of the fourth aspect, all packets for each of the command, the response, and the data transfer may include a tag ID for associating the command, the response, and the data transfer with one another. The device handle control unit may be configured to receive, as the device handle number, the tag ID included in the command.

The above-described aspect eliminates the need for the initiator apparatus to process the field added to the command or response for carrying the device handle number.

A communication system according to a first aspect of the present invention includes: an initiator apparatus having a local network that includes a first host and one or more first devices, one of the first devices being a first station; and a target apparatus having a second local network that includes a second host and one or more second devices, one of the second devices being a second station. The initiator apparatus and the target apparatus are connected via a station-to-station network between the first station and the second station. The first host is configured to share configuration information of each of the first devices with each of the first devices connected to the first local network, one of the first devices being the first station. The first station includes: a first configuration information sharing unit configured to share configuration information of the first station with the first host, the configuration information being for use in the first local network; a first device handle control unit configured to transmit a get device handle request to the target apparatus, the get device handle request being for establishing logical connection with a target device included in the target apparatus, and to receive a get device handle response that is a response to the get device handle request the from the target apparatus; a first transaction relay unit configured to relay, to the target apparatus, a command transmitted by the first host for communications with the target device included in the target apparatus, and a transaction specified by the command. The second host is configured to share configuration information of each of the second devices with each of the second devices connected to the second local network, one of the second devices being the second station. Each of the second devices includes a second configuration information sharing unit configured to share configuration information of the second device with the second host, the configuration information being for use in the second local network. The second device being the station further includes: a second device handle control unit configured to, in response to the get device handle request received from the initiator apparatus, acquire configuration information of the target device from the host, the configuration information being for use in the local network, and return the get device handle response that is a response to the get device handle request to the initiator apparatus; and a second transaction relay unit configured to relay, to the target device, the command received from the initiator apparatus and the transaction specified by the command. The relay of the transaction by the second transaction relay unit is carried out based on the configuration information of the target device acquired by the device handle control unit and without involvement of the host.

With respect to the above-described aspect, the communication system is enabled to connect the local network of the initiator apparatus and the local network of the target apparatus each having a host and to implement transparent transactions between devices belonging to the different networks.

A communication method according to a first aspect of the present invention is for use in a communication system. The communication system includes: an initiator apparatus having a local network that includes a first host and one or more first devices, one of the first devices being a first station; and a target apparatus having a second local network that includes a second host and one or more second devices, one of the second devices being a second station. The initiator apparatus and the target apparatus are connected via a station-to-station network between the first station and the second station. The communication method comprising: a first configuration information sharing step of sharing, between the first host and each first device connected to the first local network, configuration information of each first device, one of the first devices being the first station; a second configuration information sharing step of, between the second host and each second device connected to the second local network, configuration information of each second device, one of the first devices being the first station; a device handle control step of transmitting, by the first host, a get device handle request to the target apparatus, acquiring, by the second station, configuration information of a target device from the second host in response to the get device handle request, the target device belonging to the second local network, retuning, by the second station, a device handle acquisition response that is a response to the get device handle request to the initiator apparatus, and receive a get device handle response that is a response to the get device handle request the from the target apparatus; and a transaction relay step of relaying, to the target device, a command issued by the first host and a transaction specified by the command. In the transaction relay step, the relay of the transaction is carried out by the second station based on the configuration information of the target device acquired in the device handle control step and without involvement of the second host.

With respect to the above-described aspect, the communication method enables connection between the local network of the initiator apparatus and the local network of the target apparatus each having a host and implements transparent transactions between devices belonging to the different networks.

Advantageous Effects of Invention

The present invention can increase the communication speed of transactions between a remote network and a device in a local network.

BRIEF DESCRIPTION OF DRAWINGS

FIG. 1 is a block diagram showing an overall configuration of a communication system according to an embodiment of the present invention.

FIG. 5A is a view showing configuration information (an example of a capability field) of a device included in the communication system shown in FIG. 1, the configuration information being for use in the local network, and FIG. 5B is a view showing configuration information (an example of a setting field) of the device included in the communication system shown in FIG. 1, the configuration information being for use in the local network.

FIG. 7A is a view showing an exemplary packet format of a control command, FIG. 7B is a view showing an exemplary packet format of a data command, FIG. 7C is a view showing an exemplary packet format of a response, FIG. 7D is a view showing an exemplary packet format of data, and FIG. 7E is a view showing an exemplary packet format of a message.

FIG. 20 is a view showing an exemplary device list according to the first modification.

FIG. 21 is a view showing an operation sequence of a communication system according to a second modification, starting from a configuration information sharing step to a device handle acquisition control step.

FIG. 22 is a view showing an operation sequence of the communication system according to the second modification, the operation sequence related to an operation for switching to a device handle already acquired in the device handle acquisition control step.

DESCRIPTION OF EMBODIMENTS

Figure 2A:
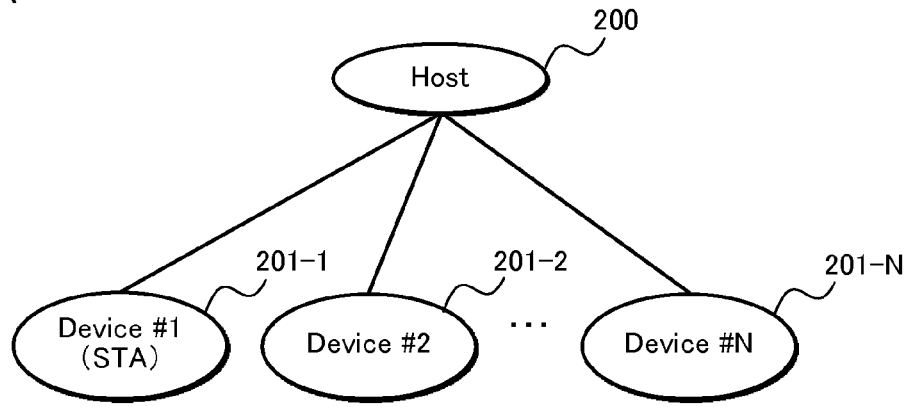
FIG. 2A is block diagram showing an exemplary logical topology of the local network shown in FIG. 1.

The following describes an embodiment of the present invention, with reference to the accompanying drawings.

Embodiment

1. Configuration
1.1 System Configuration

FIG. 1 is a block diagram showing an overall configuration of a communication system according to the embodiment of the present invention.

The communication system exemplified in FIG. 1 includes an initiator apparatus 100 and a target apparatus 140. The initiator apparatus 100 has a first local network 100A that includes a first host 101 and a plurality of first devices 102-103 all connected to a local bus 110. The target apparatus 140 is identical to the initiator apparatus 100 in terms of configuration. That is, the target apparatus 140 has a second local network 140A that includes a second host 141 and a plurality of second devices 142-144 all connected to a local bus 150.

Typically, the hosts 101 and 141 of the respective apparatuses 100 and 140 are each realized by system large-scale integration (LSI) for controlling the overall operation of the respective apparatuses 100 and 140. Host controllers 120 and 160 built in the respective hosts 101 and 141 are controlled by software such as an application or device driver executing on respective central processing units (CPUs) 121 and 161. With software executing on the CPU, the host controller 120 controls the devices 102-103 via the local bus 110. Similarly, the host controller 160 controls the devices 142-144 via the local bus 150. The respective devices 102-103 have local network interfaces 122*a*-122*b* each for connection with the local bus 110 of the local network 100A. Similarly, the respective devices 142-144 have local network interfaces 162*a*-162*c* each for connection with the local bus 150 of the local network 140A.

Each of the devices 102 and 142 comprises a communication device called a station and establishes connection between the initiator apparatus 100 and the target apparatus 140 via a station-to-station network 170. These devices 102 and 142 each comprising a communication device called a station are used to relay communications transmitted between the first local network 100A and the second local network 140A. The station-to-station network 170 is, for example, a wireless PAN using 60 GHz millimeter-wave as described above in "the Background Art", and the stations 102 and 142 each have the station-to-station network 170. The station-to-station network interfaces 123 and 163 function in the MAC and PHY layers for the wireless PAN.

In one example given with respect to the other devices 103 and 143-144, the second device 143 (second device #2) is a memory device with a built-in non-volatile memory module 164.

1.2 Local Network Topology 1.2.1 Logical Topology of Local Network

FIG. 2A is a block diagram showing an exemplary logical topology of a local network (such as the local network 100A or 140A) according to the present embodiment.

The logical topology of the local network is a star topology having a host at the center, as shown in FIG. 2A. All communications are carried out on the initiative of the host. For example, at initialization of the local network, the host 200 allocates a device ID, which serves as the address within the local network, to each of devices 201-1 through 201-N. Subsequently to the device ID allocation, the host 200 can start communications with a target device by sending a command with the destination field set to indicate the device ID of the target device. In the local network, the host 200 is the only device that is granted the command transmission right. Therefore, the host 200 detects a transmission request from the devices 201-1 through 201-N by polling or interruption and sends a command in response to the detected transmission request.

1.2.2 Physical Topology of Local Network

Figure 2B:
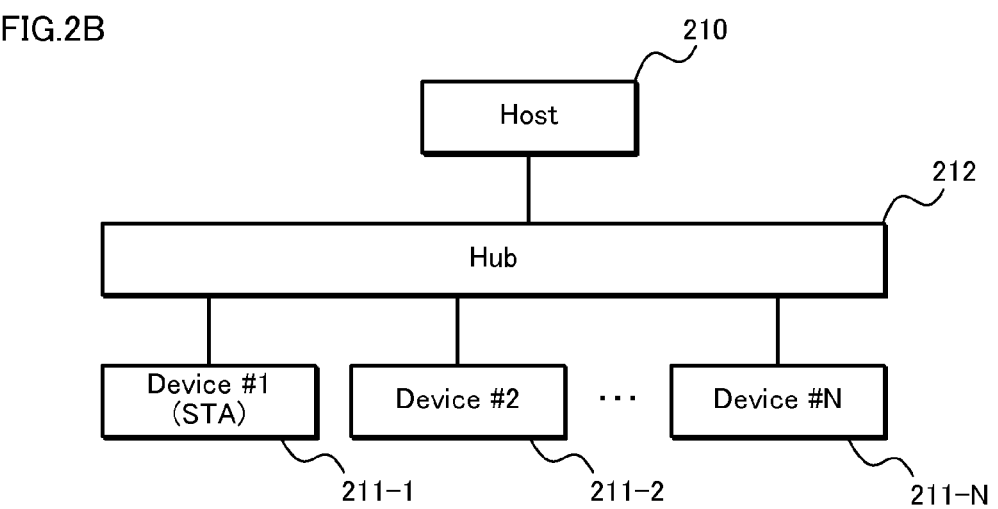
FIG. 2B is a block diagram showing an exemplary physical topology of the local network shown in FIG. 1.
Figure 2C:
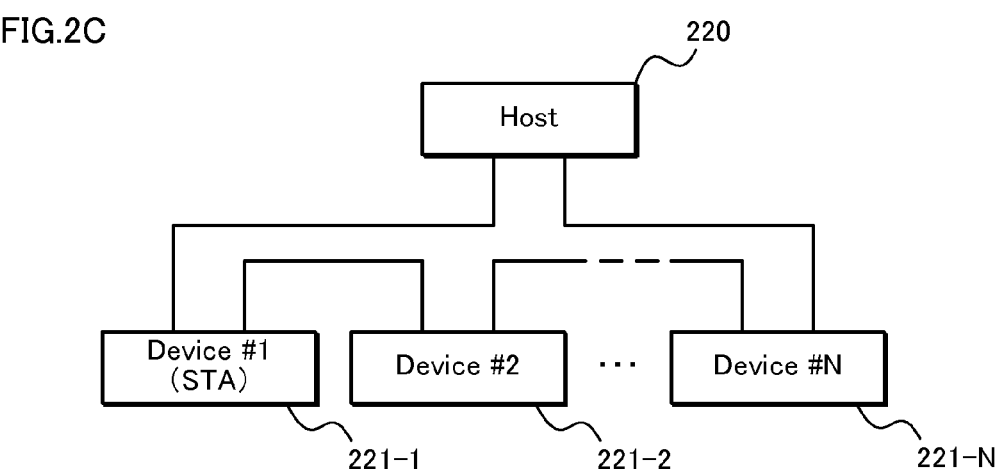
FIG. 2C is a block diagram showing another exemplary physical topology of the local network shown in FIG. 1.

FIGS. 2B and 2C are block diagrams each showing an exemplary physical topology of a local network (such as the local networks 100A and 140A) according to the present embodiment.

For example, the physical topology of the local network may be a hub topology as shown in FIG. 2B or a ring topology as shown in FIG. 2C. In the hub topology shown in FIG. 2B, the hub 212 delivers a command transmitted from the host 210 to an appropriate one of devices 211-1 through 211-N according to the destination field. In the ring topology shown in FIG. 2C, each of devices 221-1 through 221-N determines whether a command transmitted from the host 220 is to be received by that device or to be relayed to a subsequent device.

1.3 Detailed Configuration of First Station 102 and Second Station 142

1.3.1 Configuration of First Station 102

Figure 3:
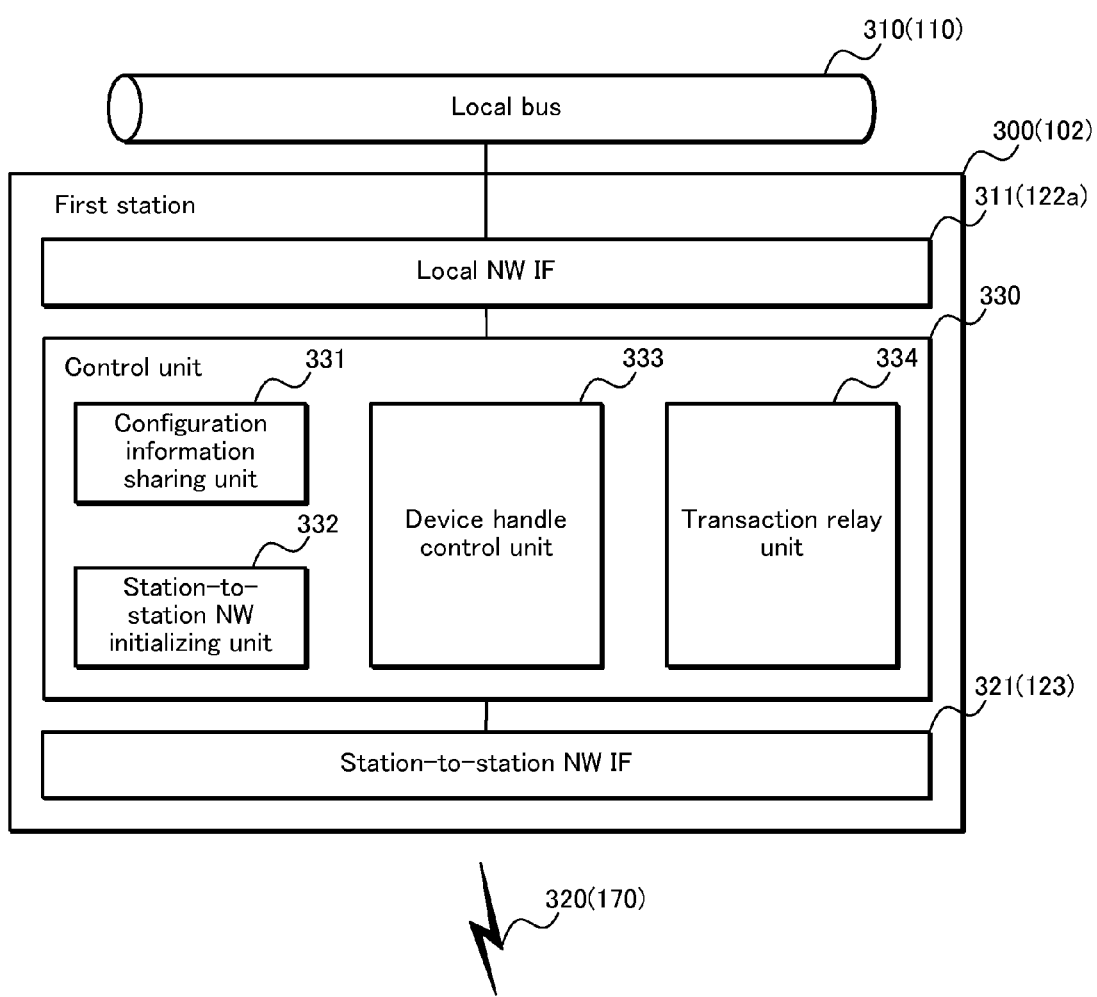
FIG. 3 is a block diagram showing a detailed configuration of a first station included in the initiator apparatus shown in FIG. 1.

FIG. 3 is a view showing the detailed configuration of the first station 102 included in the initiator apparatus 100 shown in FIG. 1.

The first station 300 (102) shown in FIG. 3 includes the local network interface 311 (122*a*) for connection with the local bus 310 (110) of the first local network 100A inside the initiator apparatus 100. Further, the first station 300 (102) includes the station-to-station network interface 321 (123) for connection with the station-to-station network 320 (170). Still further, the first station 300 (102) includes a control unit 330 for controlling the local network interface 311 (122*a*) and the station-to-station network interface 321 (123).

1.3.2 Configuration of Second Station 142

Figure 4:
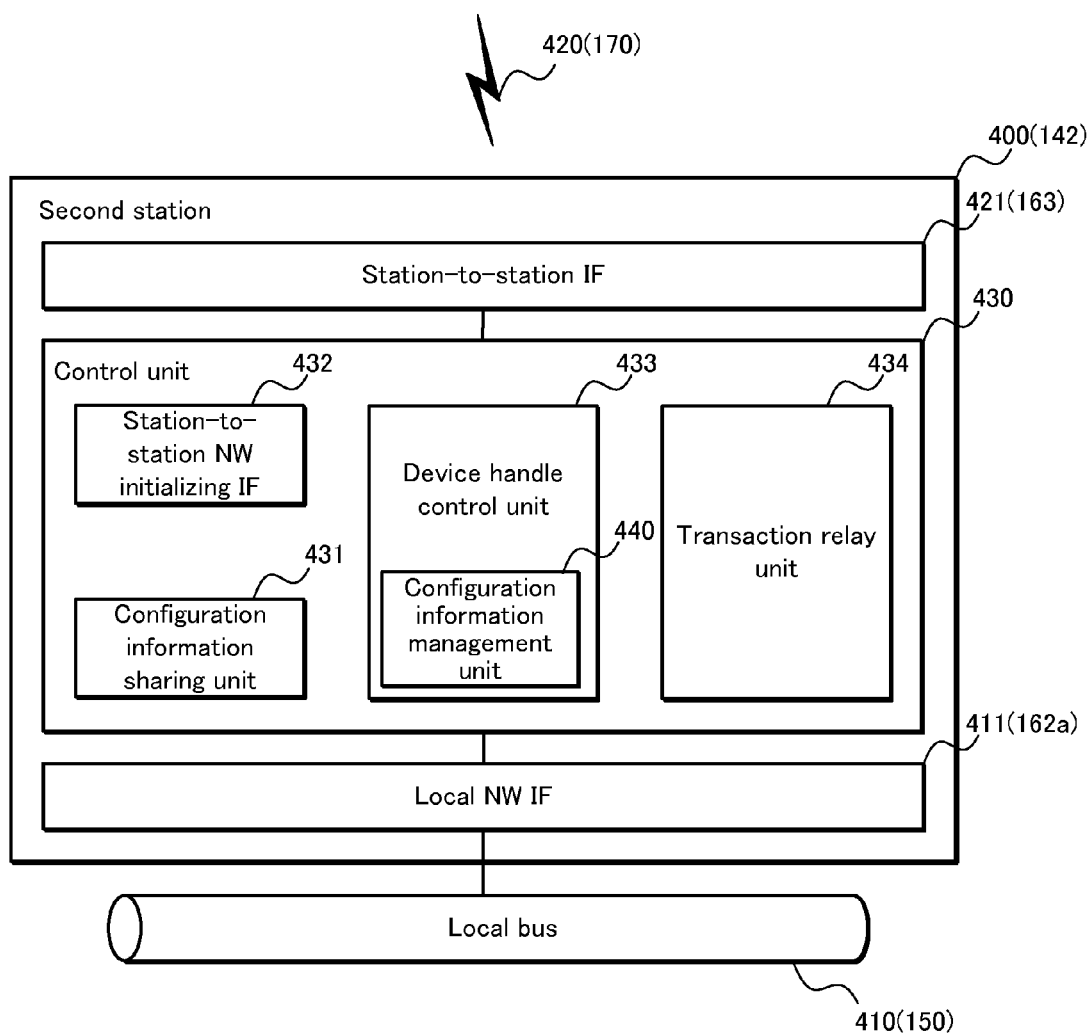
FIG. 4 is a block diagram showing a detailed configuration of a second station included in the target apparatus shown in FIG. 1.

FIG. 4 is a view showing the detailed configuration of the second station 142 included in the target apparatus 140 shown in FIG. 1.

The second station 400 (142) shown in FIG. 4 includes the local network interface 411 (162*a*) for connection with the local bus 410 (150) of the second local network 140A inside the target apparatus 140. Further, the second station 400 (142) includes the station-to-station network interface 421 (163) for connection with the station-to-station network 420 (170). Still further, the second station 400 (142) includes a control unit 430 for controlling the local network interface 411 (162*a*) and the station-to-station network interface 421 (163).

1.3.3 Configuration of Control Unit 330 of First Station 300 (102)

As shown in FIG. 3, the control unit 330 includes a configuration information sharing unit 331, a station-to-station network initializing unit 332, a device handle control unit 333, and a transaction relay unit 334.

Upon initialization of the connection with the first local network 100A, the configuration information sharing unit 331 shares configuration information of the first station 300 with the first host 101. The configuration information is for use in the first local network 100A. For this purpose, the first devices 102-103 are all provided with the configuration information sharing unit 331.

The configuration information is, for example, attribute information of the device, such as USB descriptors. The configuration information according to the present embodiment includes a capability field exemplified in FIG. 5A, and a setting field exemplified in FIG. 5B. The capability field indicates the capabilities of the device, whereas the setting field indicates the device ID and communication parameters of the device. The size (byte) column of FIGS. 5A and 5B show the data size of a device type code, for example.

The capability field includes a device type code specifying a type of the device, such as a wireless 10 device (station), general-purpose 10 device, or memory device. The capability field includes a device protocol code specifying the protocol supported by the device. The capability field also includes a maximum buffer size (Max Buffer Size) indicating the buffer size available for the device to use in communications with the host.

The setting field includes the device ID specifying the address of the device within the local network and a maximum packet size (Max Packet Size) indicating the maximum size of a packet that can be transmitted in the local network. The setting field also includes a maximum burst number (Max Burst Num) indicating the maximum number of packets that can be transmitted per burst in the local network. The maximum burst size in transmission between the host and the device is determined by multiplying the maximum packet size by the maximum burst number.

The configuration information sharing unit 331 shares the configuration information shown in FIGS. 5A and 5B with the first host 101. The first host 101 stores, in the host controller 120, the configuration information that is shared with the configuration information sharing unit 331 of each of the first devices 102-103.

The station-to-station network initializing unit 332 initializes the station-to-station network 320 (170) and establishes physical connection between the first station 102 and the second station 142.

That is, the station-to-station network initializing unit 332 operates to form the station-to-station network 320 (170). To this end, the station-to-station network initializing unit 332 establishes wireless connection (physical connection) with the confronting second station 142 through, for example, the same procedure as that described in IEEE802.11 standards listed as Patent Literature 2. To establish the connection, the station-to-station network initializing unit 332 controls the station-to-station network interface 321 (123) to cyclically transmit beacon frames. Note that a beacon frame contains a service set identifier (SSID) identifying the wireless connection. The station-to-station network initializing unit 332 then receives a probe request or association request from the confronting second station 142. Subsequently, by issuing a response to the probe or association request, the station-to-station network initializing unit 332 establishes wireless connection between the first station 102 and the second station 142.

The device handle control unit 333 receives a "get device handle request" transmitted from the first host 101 via the local bus 310 (110) of the first local network 100A. The device handle control unit 333 then relays the received get device handle request to the target apparatus 140 via the station-to-station network 320 (170). The get device handle request is a control packet for establishing logical connection between the first host 101 and the target device that belongs to the second local network 140A inside the target apparatus 140. The get device handle request includes a device handle number for identifying the target device from among the devices included in the target apparatus 140. Then, the device handle control unit 333 receives a "get device handle response" transmitted from the target apparatus 140 via the station-to-station network 320 (170). The device handle control unit 333 notifies the first host 101 of reception of the get device handle response via the local bus 310 (110) of the first local network 100A. The get device handle response includes a result flag indicating whether or not logical connection between the first host 101 and the target device corresponding to the get device handle request has been successfully established. With reference to the result flag, the first host 101 determines whether to initiate remote access to the target device. In other words, the result flag indicates whether or not the second station 142 has successfully acquired the configuration information of the target device or whether or not the second host has successfully found the target device.

The device handle control unit 333 receives a "delete device handle request" transmitted from the first host 101 via the local bus 310 (110) of the first local network 100A. The device handle control unit 333 then relays the received delete device handle request to the target apparatus 140 via the station-to-station network 320 (170). The delete device handle request refers to a control packet for disconnecting the logical connection with the target device that has been associated with the first host 101 by the get device handle request. Then, the device handle control unit 333 receives a "delete device handle response" transmitted from the target apparatus 140 via the station-to-station network 320 (170). The device handle control unit 333 notifies the first host 101 of reception of the get device handle response via the local bus 310 (110) of the first local network 100A.

The transaction relay unit 334 receives a command transmitted from the first host 101 via the local bus 310 (110) of the first local network 100A. The transaction relay unit 334 relays the command received from the first host 101 to the target apparatus 140 via the station-to-station network 320 (170). Subsequently, the transaction relay unit 334 relays all transactions specified by the command via the local bus 310 (110) of the first local network 100A as well as via the station-to-station network 320 (170). The transaction relay unit 334 relays, between the first host 101 and the target apparatus 140, each transaction transmitted via the local bus 310 (110) as well as via the station-to-station network 320 (170).

1.3.4 Configuration of Control Unit 430 of Second Station 400 (142)

As shown in FIG. 4, the control unit 430 includes a configuration information sharing unit 431, a station-to-station network initializing unit 432, a device handle controlling unit 433, and a transaction relay unit 434. The device handle control unit 433 stores therein a configuration information management table 440.

The configuration information sharing unit 431 shares configuration information of the second station 400 with the second host 141 upon initialization of the connection with the second local network 140A. The configuration information is for use in the second local network 140A. For this purpose, the second devices 142-144 are all provided with the configuration information sharing unit 431.

The configuration information sharing unit 431 shares the configuration information shown in FIGS. 5A and 5B with the second host 141. The second host 141 stores, in the host controller 160, the configuration information that is shared with the configuration information sharing unit 431 of each of the first devices 142-144.

The station-to-station network initializing unit 432 initializes the station-to-station network 420 (170) and establishes physical connection between the first station 102 and the second station 142.

That is, the station-to-station network initializing unit 432 operates to form the station-to-station network 420 (170). To this end, the station-to-station network initializing unit 432 establishes wireless connection (physical connection) with the first station 102 through, for example, the same procedure as that described in IEEE802.11 standards listed as Patent Literature 2. To establish the connection, the station-to-station network initializing unit 432 controls the station-to-station network interface 421 (163) to cyclically transmit beacon frames each of which contains an SSID identifying the wireless connection. The SSID is transmitted from the confronting first station 102. The station-to-station network initializing unit 432 then issues a probe request or association request to the confronting first station 102. The station-to-station network initializing unit 432 then receives a probe response or association response that is issued by the first station 102 in response to the request issued thereto. In response, the station-to-station network initializing unit 432 establishes wireless connection between the first station 102 and the second station 142.

The device handle control unit 433 receives a get device handle request from the initiator apparatus 100 via the station-to-station network 420 (170). The device handle control unit 433 notifies the second host 141 of reception of the get device handle request via the local bus 410 (150) of the second local network 140A. Then, from the second host 141 having received the notification, the device handle control unit 433 acquires the configuration information of the target device that is connected to the local bus 410 (150) of the second local network 140A. Note that the target device refers to the device corresponding to the device handle number that is included in the get device handle request. The device handle control unit 433 stores the thus acquired configuration information of the target device into the configuration information management table 440. Then, the device handle control unit 433 receives a get device handle response from the second host 141 via the local bus 410 (150) of the second local network 140A. The device handle control unit 433 then returns the received get device handle response to the initiator apparatus 100 via the station-to-station network 420 (170). The get device handle response includes a result flag indicating whether or not the configuration information management table 440 correctly stores the configuration information of the target device that is associated with the get device handle request. In other words, the result flag indicates whether or not logical connection between the first host 101 and the target device associated with the get device handle request has been successfully established.

Further, the device handle control unit 433 receives a delete device handle request from the initiator apparatus 100 via the station-to-station network 420 (170). The device handle control unit 433 notifies the second host 141 of reception of the delete device handle request via the local bus 410 (150) of the second local network 140A. Subsequently, the device handle control unit 433 invalidates the configuration information of the target device held in the configuration information management table 440. The device handle control unit 433 receives a delete device handle response transmitted from the second host 141 via the local bus 410 (150) of the second local network 140A. The device handle control unit 433 then returns the received delete device handle response to the initiator apparatus 100 via the station-to-station network 420 (170).

The transaction relay unit 434 receives a command from the initiator apparatus 100 via the station-to-station network 420 (170). Then, the transaction relay unit 434 relays the received command to the target device that belongs to the second local network 140A via the local bus 410 (150) of the second local network 140A. Thereafter, the transaction relay unit 434 relays all transactions specified by the command via the station-to-station network 420 (170) as well as via the local bus 410 (150) of the second local network 140A. The transaction relay unit 434 relays, between the initiator apparatus 100 and the target device, each transaction transmitted via the station-to-station network 420 (170) as well as via the local bus 410 (150).

1.4 Local Network Protocol

Figure 6:
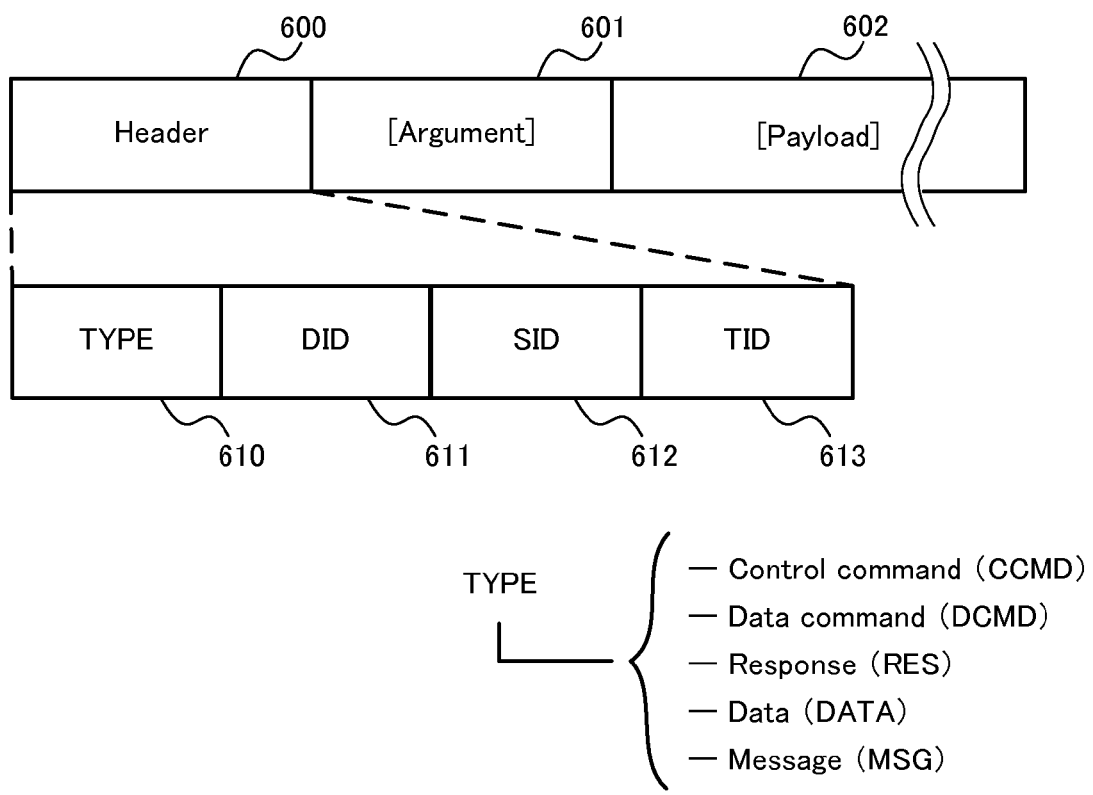
FIG. 6 is a view showing a basic structure of a packet format defined by a protocol used in the local network shown in FIG. 1.
Figure 8:
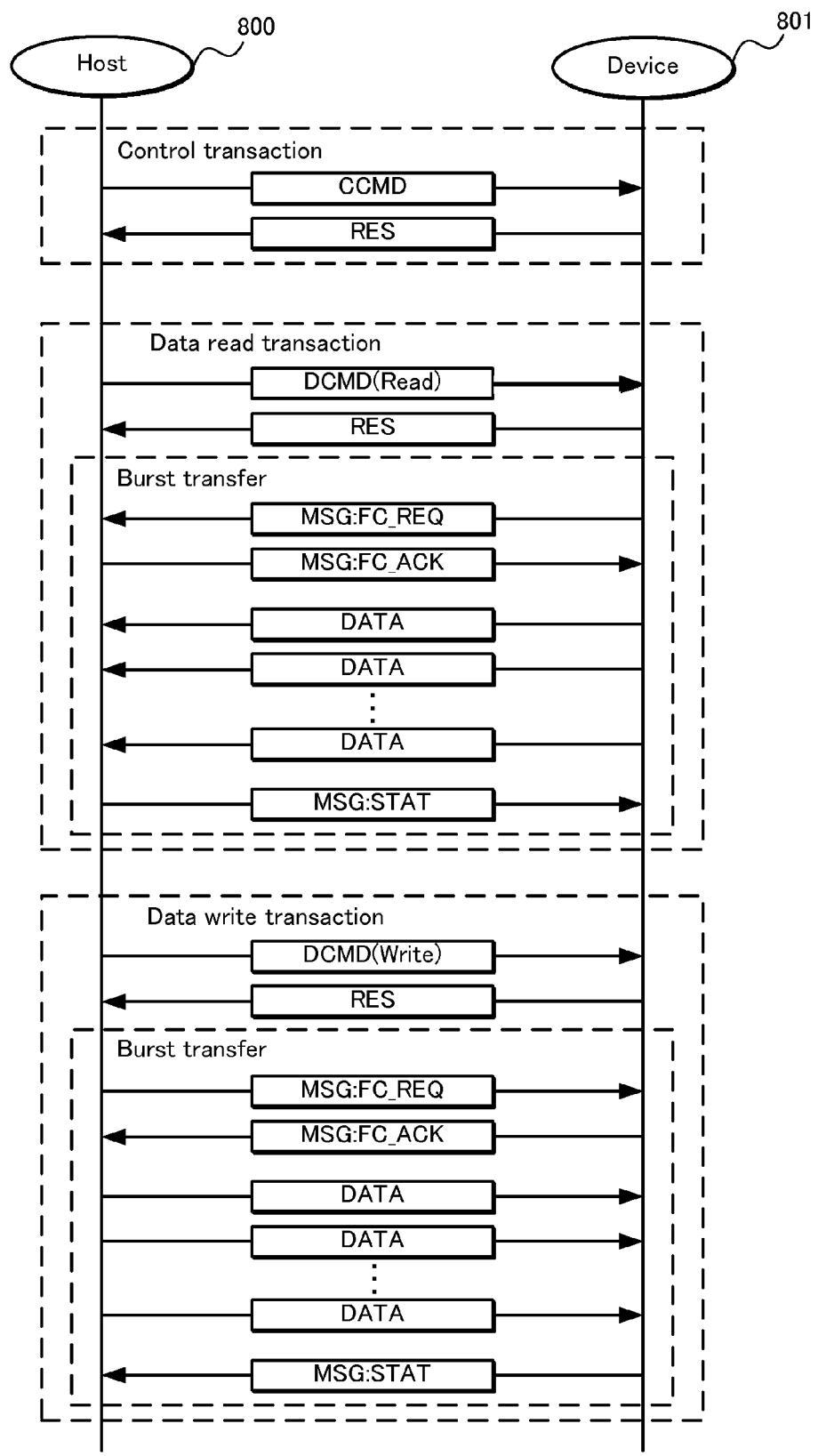
FIG. 8 is a view showing an exemplary operation sequence of a transaction defined according to the protocol used in the local network shown in FIG. 1.

The following describes the protocol of the first local network 100A inside the initiator apparatus 100 shown in FIG. 1 and of the second local network 140A inside the target apparatus 140, with reference to FIGS. 6-8. Note that it is not necessary that the first local network 100A and the second local network 140A use the same protocol. Yet, it is desirable to use the same protocol in order to reduce the load of protocol conversion occurring in the station-to-station network 170. The embodiment is described on precondition that the protocol of the first local network 100A is the same as the protocol of the second local network 140A.

1.4.1 Basic Structure of Packet Format

FIG. 6 is a view showing a basic structure of a packet format defined by the protocol of the local networks 100A and 140A.

The basic structure of a packet format shown in FIG. 6 includes a header 600, an argument 601, and a payload 602. The header 600 includes a packet type (Type) 610, a destination ID (DID) 611, a source ID (SID) 612, and a tag ID (TID) 613. Note that some packets do not include an argument and/or payload. Therefore, FIG. 6 use the labels "[Argument]" and "[Payload]"

The packet type 610 includes the detailed type of the packet. According to the embodiment, the following detailed types of packets are defined. Examples of the detailed types of a packet include a packet carrying a control command (CCMD) and a packet carrying data command (DCMD) that is used for bulk data transfer. Other examples of the detailed types of packet include a packet carrying a response (RES) which is a response to a control command or data command, and data (Data) that is transferred together with a data command. A yet another example of the detailed types of packet is a packet carrying a message (MSG) used for a status notification, and so on.

The destination ID 611 and the source ID 612 indicate the destination and source of the packet, respectively. Each ID is designated by using an appropriate one of the device IDs of the hosts 101 and 141 and the device IDs allocated to the respective devices 102-103 and 142-144. The device IDs of the hosts 101 and 141 are always "0". The device IDs allocated to the devices 102-103 and 142-144 are not equal to "0" and unique within the respective local networks 100A and 140A. The tag ID 613 is used to associate a command, which is issued by the hosts 101 and 141 to the devices 102-103 and 142-144, with a response or data to be transferred together with the command.

1.4.2 Detailed Packet Format

The following describes the detailed format of a packet defined by each packet type 610 shown in FIG. 6, with reference to FIGS. 7A-7E. Note that each header shown in FIGS. 7A-7E corresponds to the header 600 described with reference to FIG. 6.

1.4.2.1 Control Command

FIG. 7A is a view showing an exemplary packet format of a control command.

The argument of a control command includes: an R/W flag 700 indicating one of the access types, namely read or write; a payload length (PLEN) 701 indicating the size of the control data; and an IO address 702 indicating the address of the control data. The payload of the control command contains control data 703 of the size specified by the payload length 701, only when the R/W flag 700 is set to "write". When the R/W flag 700 is set to "read", the control command includes no control data as the control data is to be included in a response to the control command. Note that some control commands do not carry any payload. FIG. 7A therefore use the label "[Payload]".

The configuration information of each of the devices 102-103 and 142-144 is stored in the respective configuration information sharing units 331 and 431, each of which is a register that can be designated with an appropriate IO address 702. Therefore, the control command enables the hosts 101 and 141 to access an appropriate one of the configuration information sharing units 331 and 431. For example, with the control command containing the R/W flag 700 set to "read", the hosts 101 and 141 can read information contained in the capability field of the configuration information from the devices 102-103 and 142-144. Similarly, with the control command containing the R/W flag 700 set to "write", the hosts 101 and 141 can write information into the setting field of the configuration information held in the devices 102-103 and 142-144.

1.4.2.2 Control Command

FIG. 7B is a view showing an exemplary packet format of a control command.

The argument of a data command includes the R/W flag 710 indicating one of the access types, namely read or write. The argument of a data command also includes, as an extended argument that follows the argument described above, a memory address 711 and a transfer size 712 respectively indicating the start address and total size of data to be transferred.

1.4.2.3 Response

FIG. 7C is a view showing an exemplary packet format of a response.

The argument of a response includes a negative acknowledge (NACK) flag 720 indicating whether or not the control command or data command is correctly received by the device specified by the destination ID 611. The payload of a response contains control data 721 that is read in response to a control command only when the R/W flag 700 of the control command is set to "read". On the other hand, when the R/W flag 700 of the control command is set to "write", the response contains no control data because the control data is contained in the control command. Note that some responses do not carry any payload. FIG. 7C therefore use the label "[Payload]".

1.4.2.4 Data

FIG. 7D is a view showing an exemplary packet format of data.

The data packet contains no argument, and the payload contains data blocks 730, which are data accessed in response to the data command and fragmented into blocks of a predetermine size. The maximum size of a data block 730 is determined by the maximum packet size (Max Packet Size) indicated in the setting field of the configuration information shown in FIG. 5B.

1.4.2.5 Message

FIG. 7D is a view showing an exemplary packet format of a message.

The argument of a message includes a message category (CTG) 740 indicating the category of the message and a message code (CODE) 741 indicating additional information for the corresponding message category.

Examples of the message category 740 include a flow control request (FC_REQ, which stands for Flow Control Request) and a flow control response (FC_ACK, which stands for Flow Control Acknowledgement). Further examples of the message category 740 include a status (STAT, which stands for Status) and a get device handle request (GET_DH_REQ, which stands for Get Device Handle Request). Still further examples of the message category 740 include a get device handle response (GET_DH_ACK, which stands for Get Device Handle Acknowledgement). Still further examples of the message category 740 include a delete device handle request (DEL_DH_REQ, which stands for Delete Device Handle Request). Still further examples of the message category 740 include a delete device handle response (DEL_DH_ACK, which stands for Delete Device Handle Acknowledgement) and an interrupt (INT, which stands for Interrupt).

The flow control request and the flow control response are flow control information exchanged between the source and the destination prior to data transfer. The status is used by the destination of the data transfer for notifying the source of a receive error after the data transfer. The get device handle request and the get device handle response, as well as the delete device handle request and the delete device handle response, are all used for device handle control. The interrupt is used by the device to asynchronously notify the host of the status.

When the message category 740 indicates the status, the message code 741 includes information indicating whether or not a receive error has occurred. Further, the message code 741 of the get device handle request includes the device handle number identifying the target device. The message code 741 of each of the get device handle response and the delete device handle response includes a result flag indicating whether or not a corresponding one of the get device handle request and the delete device handle request has been successful.

1.4.3 Transaction

FIG. 8 is a view showing an exemplary operation sequence of a transaction defined by the protocol of the local networks 100A and 140A.

1.4.3.1 Control Transaction

In a control transaction, a host 800 issues a control command (CCMD) to a device 801, and the device 801 returns a response (RES) to the control command to the host 800. This completes the control transaction. Here, the control data to be written by the host 800 into the device 801 is contained in the control command. On the other hand, the control data to be read by the host 800 from the device 801 is included in the response.

1.4.3.2 Data Read Transaction

In a data read transaction, the host 800 issues a data command (DCMD) that includes the R/W flag 710 set to "read" to the device 801. The device 801 returns a response (RES) to the data command to the host 800. This initiates the data transfer specified by the data command.

In a data transfer for read access as well as a data transfer for write access according to the present embodiment, data of the size specified by the transfer size 712 included in the data command shown in FIG. 7B is transferred. The data transfer according to the present embodiment involves generating data packets by dividing the data of the specified size into the maximum packet size (Max Packet Size) indicated in the configuration information of the device 801 shown in FIG. 5B. In the data transfer according to the present embodiment, the thus generated data packets are transferred by sending a predetermined number of packets per burst. The maximum number of packets that can be send per burst transfer is defined by the maximum burst number (Max Burst Num) specified by the configuration information shown in FIG. 5B.

In burst data transfer, the device 801 being the data transmission source issues a flow control request (FC_REQ) to the host 800 being the destination of the data. In burst transfer, the host 800 returns a flow control response (FC_ACK) to the device 801 in response to the flow control request. As a consequence, the host 800 and the device 801 mutually confirm the buffer status, and then the device 801 starts the data transfer to the host 800. After completion of the data transfer, the host 800 being the destination of the data issues, to the device 801, the message code 741 in which the reception result of the data transfer is indicated in the status (STAT). The device 801 receives the status and finds out the reception result from the content of the message code 741. The data read transaction completes by repeating a series of burst transfer operations from issuance of a flow control request to reception of a status for a number of times until the transfer size 712 is reached.

1.4.3.3 Data Write Transaction

In a data write transaction, the host 800 issues a data command (DCMD) that includes the R/W flag 710 set to "write" to the device 801. The device 801 returns a response (RES) to the data command to the host 800. This initiates the data transfer requested by the data command.

In burst data transfer, the host 800 being the data transmission source issues a flow control request (FC_REQ) to the device 801 being the destination of the data. In burst transfer, the device 801 returns a flow control response (FC_ACK) to the host 800 in response to the flow control request. As a consequence, the host 800 and the device 801 mutually confirm the buffer status, and then the host 800 starts the transfer of the data to the device 801. After completion of the data transfer, the device 801 being the destination of the data issues, to the host 800, the message code 741 in which the reception result of the data transfer is indicated in the status (STAT). The host 800 receives the status and finds out the reception result from the content of the message code 741. The data write transaction completes by repeating a series of burst transfer operations from issuance of a flow control request to reception of a status for a number of times until the transfer size 712 is reached.

Note that the present embodiment as well as the later-described modifications is not limited to the protocol described with reference to the packet format and transaction described above and other variations are possible. For example, in the case where the local network is implemented by USB, the control command and data command correspond to token packets used in USB, whereas the response and status correspond to handshake packets used in USB. In addition, the control transaction corresponds to control transfer used in USB, whereas the data transaction corresponds to a bulk transfer in USB.

2. Operation

The following now describes operation of communication system according to the present embodiment, with reference to the configurations shown in FIGS. 1-5 and the protocols of the local network shown in FIGS. 6-8.

2.1 Operation Sequence of Initiator Apparatus 100

Figure 9:
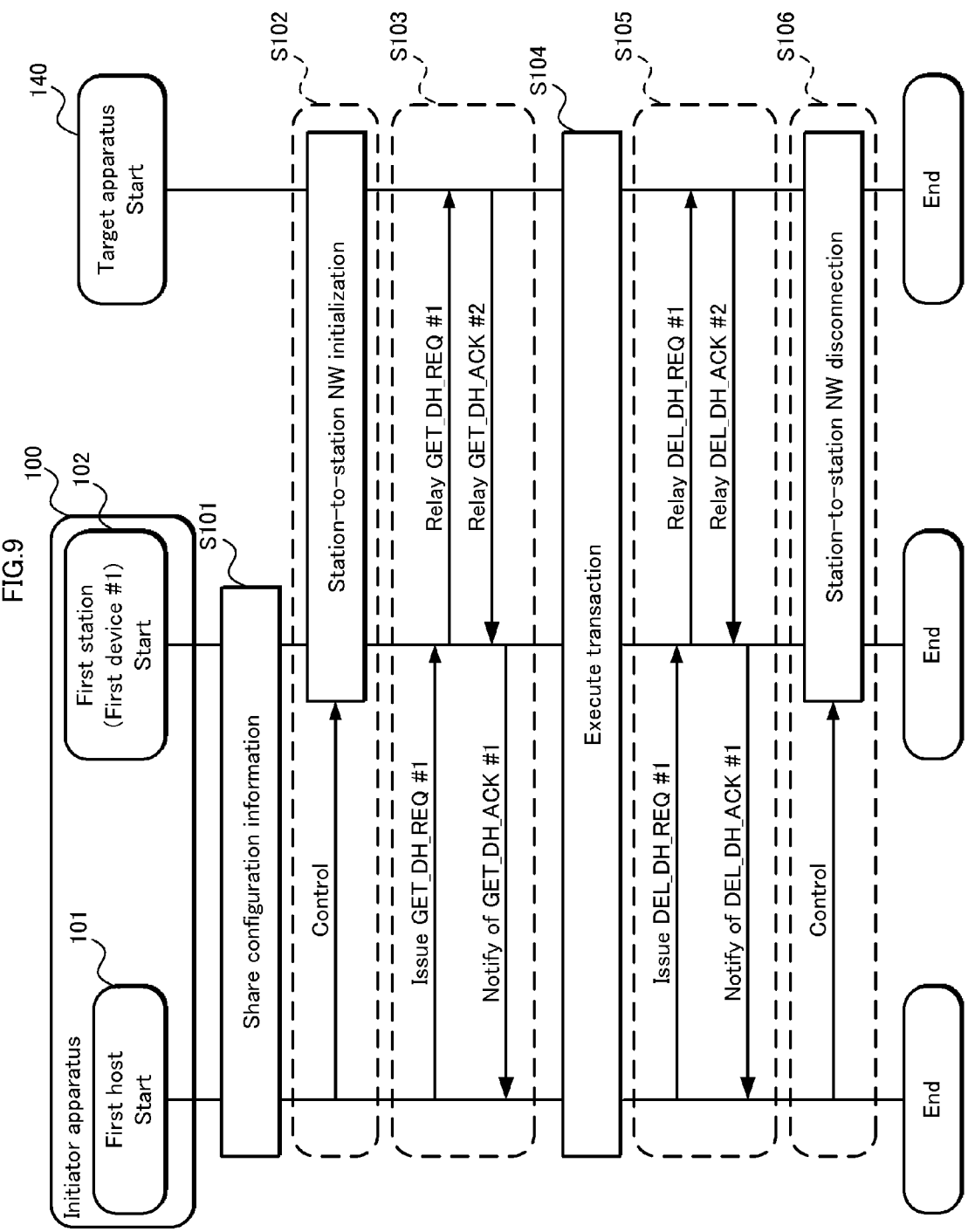
FIG. 9 is a view showing an operation sequence of the initiator apparatus shown in FIG. 1.

FIG. 9 is a view showing an operation sequence of the initiator apparatus 100 shown in FIG. 1.

2.1.1 Configuration Information Sharing Step S101

The first host 101 operates to share the respective pieces of configuration information with the devices connected to the local bus 110 of the first local network 100A, namely with the first devices 102-103, which naturally include the device acting as the first station 102. The first host 101 then stores the respective pieces of configuration information of the first devices 102-103 into the host controller 120. On the other hand, each of the first devices 102-103 stores its own configuration information into the configuration information sharing unit 331. FIG. 9 omits illustration of the procedure for sharing the configuration information between the first host 101 and the first device 103.

The following describes an exemplary procedure for sharing the configuration information shown in FIGS. 5A and 5B between the first host 101 and the configuration information sharing unit 331.

To share the configuration information shown in FIGS. 5A and 5B with the first host 101, the configuration information sharing unit 331 is provided with information to be held in the capability field of its own configuration information in advance (at the time of device shipment, for example).

At initialization of the first local network 100A, the first host 101 allocates a device ID that is unique within the first local network 100A to each of the first devices 102-103 connected to the local bus 110. Then, the first host 101 stores the respective device IDs of the first devices 102-103 into the host controller 120. In addition, the first host 101 controls the configuration information sharing unit 331 of each of the devices 102-103 such that the device ID allocated to that device is set in an appropriate position in the setting field.

Each configuration information sharing unit 331 discloses the information held in the capability field to the first host 101. Each configuration information sharing unit 331 acquires communication parameters (the maximum packet size and the maximum burst number) from the first host 101 in accordance with the information held in the capability field and stores the thus acquired parameters into an appropriate position in the setting field. The first host 101 acquires information held in the capability field (the device type code, device protocol, and maximum buffer size) from the configuration information sharing unit 331 of each of the first devices 102-103. The first host 101 then determines the maximum packet size and the maximum burst number in a range permissible by the acquired maximum buffer size and sets the thus determined maximum packet size and maximum burst number in an appropriate position in the configuration information sharing unit 331.

The first host 101 stores the respective pieces of configuration information of the first devices 102-103 (information held in the capability field acquired from each of the devices 102-103 and information held in the setting field of each of the devices 102-103) into the host controller 120.

Through this procedure, the first host 101 can avoid occurrence of buffer overflow during burst transfer between the first host 101 and each of the devices 102-103.

2.1.2 Station-to-Station Network Initialization Step S102

The first host 101 controls the first station 102, and the first station 102 causes the station-to-station network initializing unit 332 to initialize the station-to-station network 170. The first host 101 then establishes physical connection between the initiator apparatus 100 and the target apparatus 140.

2.1.3 Device Handle Acquisition Control Step S103

The first host 101 issues a get device handle request (GET_DH_REQ) #1 that includes a device handle number to the first station 102. Note that the destination ID 611 and the source ID 612 of the get device handle request #1 are the device IDs of the first station 102 and the first host 101, respectively. The first station 102 receives the get device handle request #1 via the local bus 110 of the first local network 100A. The first station 102 causes the device handle control unit 333 to relay the received get device handle request #1 to the target apparatus 140 via the station-to-station network 170.

As above, the first host 101 issues a get device handle request, and the first station 102 relays the get device handle request to the target apparatus 140. Instead of this, however, the following is possible, for example. That is, with the use of, for example, a control command (CCMD), the first host 101 may instruct the first station 102 to issue a get device handle request. Upon receipt of the instruction, the first station 102 causes the device handle control unit 333 to issue the get device handle request. The first station 102 then transmits the get device handle request to the target apparatus 140 via the station-to-station network 170.

Subsequently, the first station 102 receives a get device handle response (GET_DH_ACK) #2 that includes a result flag described above from the target apparatus 140 via the station-to-station network 170. The first station 102 causes the device handle control unit 333 to overwrite the destination ID 611 and the source ID 612 of the get device handle response #2 with the device IDs of the first host 101 and the first station 102, respectively. Then, the first station 102 causes the device handle control unit 333 to return a response to the get device handle request #1 to the first host 101 via the local bus 110 of the first local network 100A. More specifically, the response to the get device handle request #1 is a get device handle response (GET_DH_ACK) #1 acquired by overwriting the destination ID 611 and the source ID 612. The get device handle response #1 corresponds to a notification that indicates reception of the get device handle response.

The first host 101 receives the get device handle response #1 and checks the result flag included in the received get device handle response #1 to confirm whether or not logical connection with the target device included in the target apparatus 140 has been successfully established. Only when the result flag indicates success, the first host 101 performs the subsequent step, which is a transaction execution step S104. In one example, when the result flag indicates failure, the device handle number included in the get device handle request may be changed to retry the device handle acquisition control step S103. In another example, when the result indicates failure, a station-to-station network disconnection step S106, which will be described later, may be performed.

For the get device handle request and the get device handle response, the message packet shown in FIG. 7E may be used, for example. In this case, the message code (CODE) 742 of the message packet includes a device handle number that is for the initiator apparatus 100 to identify the target device from among the devices included in the target apparatus 140. For example, the device handle number specifies an appropriate one of the device IDs that are allocated to the second devices 142-144 and indicated in the configuration information of the second local network 140A inside the target apparatus 140. By checking the result flag included in the message code (CODE) 742, the first host 101 can confirm whether or not the target device corresponding to the device handle number specified in the get device handle request exists. In this description, the device handle number is a device ID. Yet, it is not necessary to directly use the device IDs of the second devices 142-144 as the device ID. That is, it is sufficient as long as the device handle number allows the target apparatus 140 to manage the correspondence between device handle number included in a get device handle request and the device ID of the target device.

2.1.4 Transaction Execution Step S104

In the device handle acquisition control step S103, the first host 101 confirms that the logical connection with the target device included in the target apparatus 140 has been established. After confirming the logical connection, the first host 101 initiates the transaction with the first station 102 as shown in FIG. 8. Then, the first station 102 causes the transaction relay unit 334 to relay the transaction to and from the target apparatus 140 via the station-to-station network 170. In order to continue the communications after switching the target device, the first host 101 moves back to the device handle acquisition control step S103. In order to end the communications, on the other hand, the first host 101 moves onto a device handle deletion control step S105.

2.1.5 Device Handle Deletion Control Step S105

The first host 101 transmits a delete device handle request (DEL_DH_REQ) #1 to the first station 102. Note that the destination ID 611 and the source ID 612 of the delete device handle request #1 are the device IDs of the first station 102 and the first host 101, respectively. The first station 102 receives the delete device handle request #1 via the local bus 110 of the first local network 100A. The first station 102 causes the device handle control unit 333 to relay the received delete device handle request #1 to the target apparatus 140 via the station-to-station network 170.

As above, the first host 101 issues a delete device handle request, and the first station 102 relays the delete device handle request to the target apparatus 140. Instead of this, the following is possible, for example. That is, with the use of a control command (CCMD), for example, the first host 101 may instruct the first station 102 to issue a delete device handle request. Upon receipt of the instruction, the second station 102 causes the device handle control unit 333 to issue a delete device handle request. The second station 102 then transmits the delete device handle request to the target apparatus 140 via the station-to-station network 170.

Subsequently, the first station 102 receives a delete device handle response (GET_DH_ACK) #2 that includes a result flag described above from the target apparatus 140 via the station-to-station network 170. Then, the first station 102 causes the device handle control unit 333 to overwrite the destination ID 611 and the source ID 612 of the delete device handle response #2 with the device IDs of the first host 101 and the first station 102, respectively. The first station 102 causes the device handle control unit 333 to return a response to the delete device handle request #1 to the first host 101 via the local bus 110 of the first local network 100A. More specifically, the response to the delete device handle request #1 is a delete device handle response #1 obtained by overwriting the destination ID 611 and the source ID 612. The delete device handle response #1 corresponds to a notification that indicates reception of the delete device handle response.

The first host 101 receives the delete device handle response #1 and checks the result flag included in the received delete device handle response #1 to confirm whether or not the logical connection with the target device included in the target apparatus 140 has been successfully disconnected. Only when the result flag indicates success, the first host 101 performs the subsequent station-to-station network disconnection step S106.

Note that it is not necessary that the delete device handle request and the delete device handle response include a device handle number. It is sufficient that disconnection of the logical connection between the first host 101 and all the target devices is ensured.

2.1.6 Station-to-Station Network Disconnection Step S106

The first host 101 controls the first station 102, and the first station 102 disconnects the physical connection between the initiator apparatus 100 and the target apparatus 140 via the station-to-station network 170.

2.2 Operation Sequence of Target Apparatus 140

Figure 10:
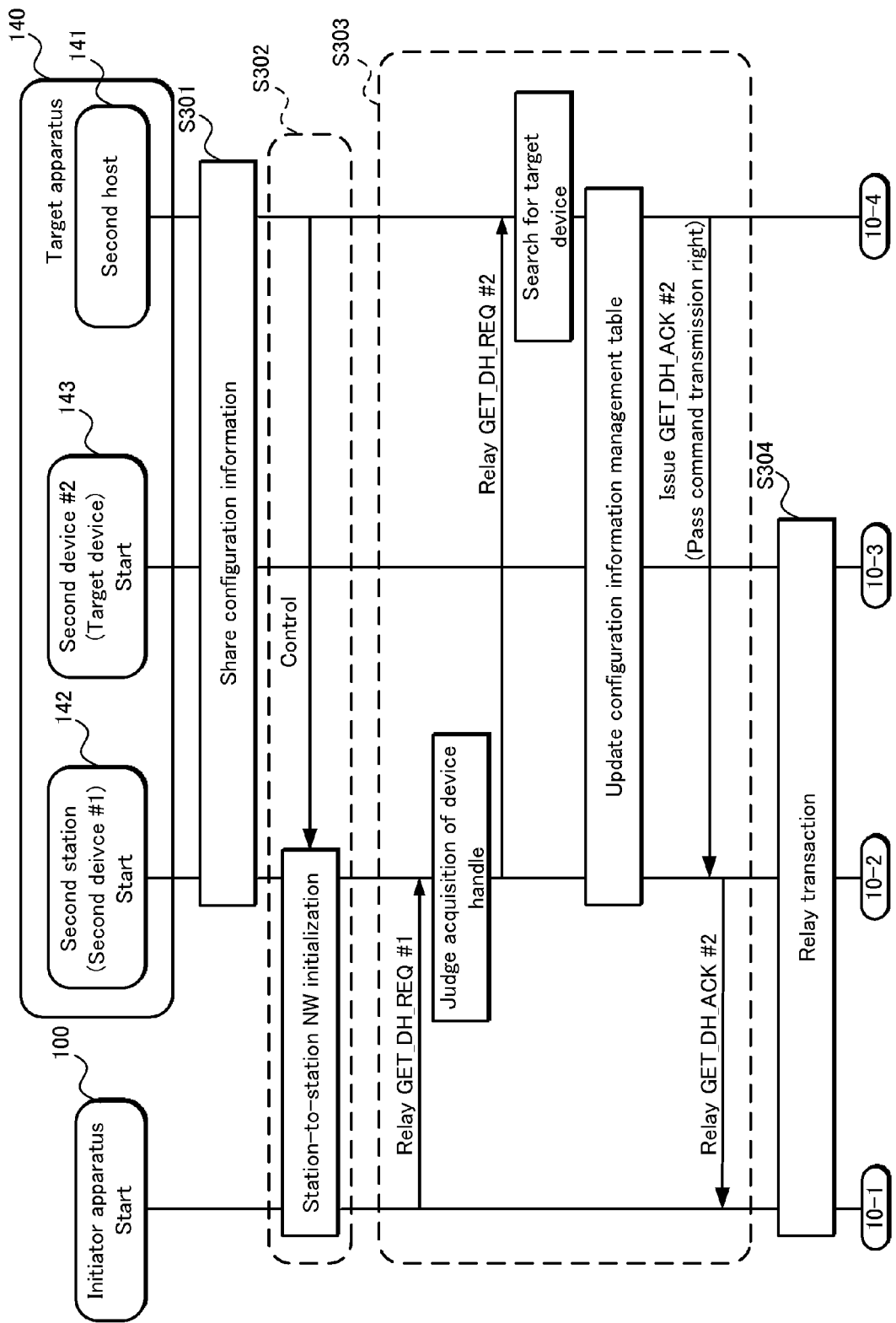
FIG. 10 is a view showing an operation sequence of the target apparatus shown in FIG. 1.
Figure 11:
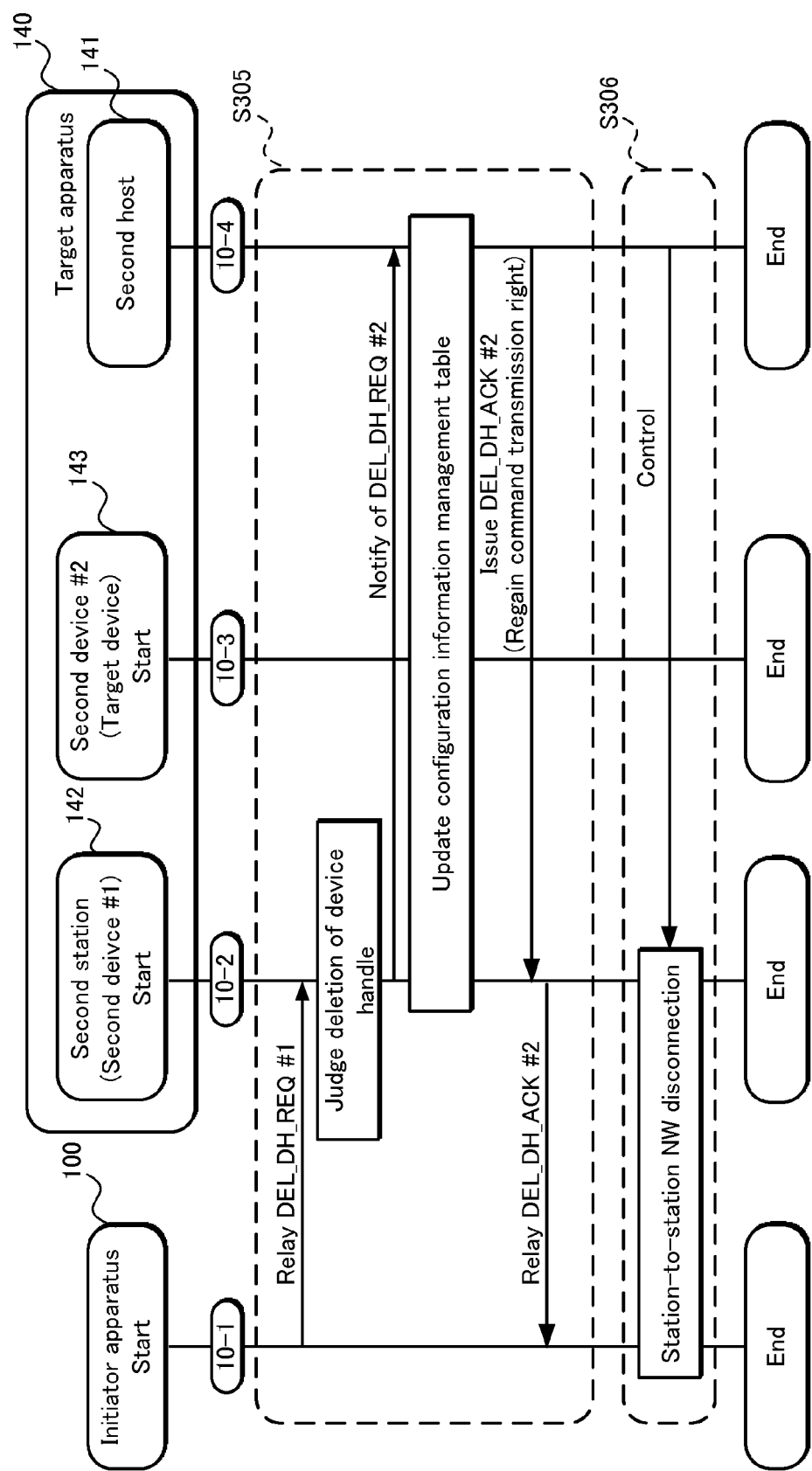
FIG. 11 is a view showing the operation sequence continued from FIG. 10.

FIGS. 10 and 11 are views showing an operation sequence of the target apparatus 140. In the operation sequence shown in FIGS. 10 and 11, the second device 143 (second device #2) is illustrated as the device corresponding to the device handle number included in the get device handle request.

2.2.1 Configuration Information Sharing Step S301

The second host 141 operates to share the respective pieces of configuration information with the devices connected to the local bus 150 of the second local network 140A, namely with the second devices 142-144, which naturally include the device acting as the second station 142. The second host 141 then stores the respective pieces of configuration information of the second devices 142-144 into the host controller 160. On the other hand, each of the second devices 142-144 stores its own configuration information into the configuration information sharing unit 431. FIG. 10 omits illustration of the procedure for sharing the configuration information between the second host 141 and the second device 144.

The following describes an exemplary procedure for sharing the configuration information shown in FIGS. 5A and 5B between the second host 141 and the configuration information sharing unit 431.

To share the configuration information shown in FIGS. 5A and 5B with the second host 141, the configuration information sharing unit 431 is provided with information to be held in the capability field of its own configuration information in advance (at the time of device shipment, for example).

At initialization of the second local network 140A, the second host 141 allocates a device ID that is unique within the second local network 140A to each of the second devices 142-144 connected to the local bus 150. Then, the second host 141 stores the respective device IDs of the second devices 142-144 into the host controller 160. In addition, the second host 141 controls the configuration information sharing unit 431 of each of the second devices 142-144 such that the device ID allocated to that device is set in an appropriate position in the setting field.

Each configuration information sharing unit 431 discloses the information held in the capability field to the second host 141. Each configuration information sharing unit 431 acquires communication parameters (the maximum packet size and the maximum burst number) from the second host 141 in accordance with the information held in the capability field and stores the thus acquired parameters into an appropriate position in the setting field. In the transaction relay step S304, which will be described later, the second station 142 substitutes for the second host 141. That is, the second station 142 relays the transaction to and from the target device and therefore is required to have a buffer comparable to that of the second host 141 or larger. In view of this, the second host 141 acquires information held in the capability field (the device type code, device protocol, and maximum buffer size) from the configuration information sharing unit 431 of each of the second devices 142-144. For each of the second devices 142-144, which naturally include the device acting as the second station 142, the second host 141 determines the maximum packet size and the maximum burst number within a range permissible by the acquired maximum buffer size. The second host 141 then sets the thus determined maximum packet size and maximum burst number in an appropriate position in the configuration information held in the configuration information sharing unit 431.

The second host 141 stores the configuration information of each of the second devices 142-144 into the host controller 160. The configuration information of each of the second devices 142-144 includes pieces of information held in the capability field and in the setting field of the corresponding one of the second devices 142-144.

As a consequence, it is ensured that the second station 142 has a buffer that is at least equal to the burst transfer size defined by the product of the maximum packet size and the maximum burst number, with respect to every device that can possibly be the target device. Therefore, the second station 142 is able to substitute for the second host 141.

The second host 141 also determines the maximum packet size and the maximum burst number for each of the second devices other than the second station 142 (namely, for each of the second devices 143-144). More specifically, the second host 141 determines the maximum packet size and the maximum burst number within a range permissible by the maximum buffer size acquired from the second station 142 and also by the maximum buffer size acquired from the corresponding one of the second devices 142-144. The second host 141 then sets the thus determined maximum packet size and maximum burst number into an appropriate position in the configuration information sharing unit 431. In addition, the second host 141 may store the thus determined maximum packet size and maximum burst number into the host controller 160. In another example, the second host 141 determines the maximum packet size and maximum burst number for each of the second devices other than the second station 142 (namely, for each of the second devices 143-144) within a range permissible by the maximum buffer size acquired from the corresponding one of the second devices 143-144. The second host 141 then sets the thus determined maximum packet size and maximum burst number into an appropriate position in the configuration information sharing unit 431. In addition, the second host 141 may store the thus determined maximum packet size and maximum burst number into the host controller 160.

2.2.2 Station-to-Station Network Initialization Step S302

The second host 141 controls the second station 142, and the second station 142 causes the station-to-station network initializing unit 432 to initialize the station-to-station network 170. The second host 141 then establishes physical connection between the target apparatus 140 and the initiator apparatus 100.

2.2.3 Device Handle Acquisition Control Step S303

The second station 142 receives a get device handle request (GET_DH_REQ) #1 that includes a device handle number from the initiator apparatus 100 via the station-to-station network 170. The second station 142 causes the device handle control unit 433 to judge the configuration information of the target device corresponding to the device handle number included in the get device handle request has already been acquired. The judgment is made with reference to the configuration information management table 440. In this operation sequence, it is assumed that the configuration information of the target device corresponding to the device handle number is judged not to have been acquired yet. Therefore, the second station 142 causes the device handle control unit 433 to overwrite the destination ID 611 and the source ID 612 of the get device handle request #1 with the device IDs of the second host 141 and the second station 142, respectively. As a result of overwriting the destination ID 611 and the source ID 612, a get device handle request (GET_DH_REQ) #2 is obtained. The second station 142 then transmits the get device handle request (GET_DH_REQ) #2 to the second host 141 via the local bus 150 of the second local network 140A. The get device handle request #2 corresponds to a notification that indicates reception of the get device handle request.

The second host 141 receives the get device handle request #2 from the second station 142 and searches for the target device corresponding to the device handle number included in the get device handle request #2 from among the second devices 142-144.

When the device handle number directly specifies the device ID of one of the second devices 142-144, the second host 141 selects the device corresponding to that device ID as the target device. When the device handle number is not a value directly specifying the device ID of one of the second devices 142-144, the second host 141 performs the following process. That is, the second host 141 selects one of the devices as the target device based on the respective pieces of the configuration information of the second devices 142-144 held in the host controller 160 and associates the device ID and the device handle number.

In this operation sequence, the second host 141 selects the second device 143 (second device #2) as the target device. Consequently, the second host 141 transmits the configuration information of the target device (second device 143) held in the host controller 160 to the second station 142 via the local bus 150 of the second local network 140A. The second station 142 receives the specific piece of configuration information that includes the device ID of the target device 143. The second station 142 then causes the device handle control unit 433 to store the received piece of configuration information, which includes the received device ID, into the configuration information management table 440 in association with the device handle number included in the get device handle request.

The second host 141 issues a response to the get device handle request #2 to the second station 142. More specifically, the response to the get device handle request #2 is a get device handle response (GET_DH_ACK) #2 that includes a result flag indicating whether or not the target device has been successfully found (in this example, the result flag indicates success). Then, the second host 141 hands over the command transmission right, which is the right to transmit commands to the target device, to the second station 142. Consequently, the second host 141 is no longer in position to transmit a command to the target device via the local bus 150 of the second local network 140A. Note that the destination ID 611 and the source ID 612 of the get device handle request #2 are the device IDs of the second station 142 and the second host 141, respectively. The second station 142 receives the get device handle response #2 via the local bus 150 of the second local network 140A. In addition, the second station receives the command transmission right, which is the right to transmit commands to the target device, from the second host 141. The second station 142 then causes the device handle control unit 433 to transmit the get device handle response #2 received from the second host 141 to the initiator apparatus 100 via the station-to-station network 170.

The second host 141 issues a get device handle response that includes a result flag indicating whether or not the target device has been successfully searched. Then, the second station 142 relays the get device handle response to the initiator apparatus 100. Instead of the above procedure, the following is possible, for example. That is, with the use of a control command (CCMD), for example, the second host 141 may instruct the second station 142 to issue a get device handle response that includes a result flag indicating whether or not the target device has been successfully found. Upon receipt of the instruction, the second station 142 causes the device handle control unit 333 to issue the get device handle response that includes the result flag. The second station 142 then transmits the get device handle response to the initiator apparatus 100 via the station-to-station network 170.

With respect to the judgment as to acquisition of the device handle, it is assumed that the second station 142 judges that the target device corresponding to the device handle number included in the get device handle request has been acquired. In this case, substituting for the second host 141, the second station 142 performs the procedure from the operation of notifying the second host 141 of the get device handle request to the operation of issuing a get device handle response from the second host 141 to the station-to-station network 170. That is, the second station 142 operates on its own to issue a get device handle response that includes a result flag indicating success to the initiator apparatus 100 via the station-to-station network 170.

2.2.4 Transaction Execution Step S304

The second station 142 causes the transaction relay unit 434 to relay the command that is received from the initiator apparatus 100 via the station-to-station network 170 and also to relay the transaction specified by the command to and from the target device. At this time, the relay by the second station 142 is performed without intermediary of the second host 141. Here, it is assumed that in the device handle acquisition control step S303, the second station 142 has acquired the configuration information (including the device ID) of the target device. The second station 142 overwrites the destination ID 611 of the packets received from the initiator apparatus 100 with the device ID of the target device according to the configuration information of the target device having been acquired. Similarly, the second station 142 overwrites the source ID 612 with the device ID of the second station 142.

Subsequently, the second station 142 relays transactions in response to a request from the initiator apparatus 100. On receiving another get device handle request from the initiator apparatus 100, the second station 142 goes back to the device handle acquisition control step S303 to continue communications while switching the target device. On the other hand, when the target apparatus 140 receives a delete device handle request (DEL_DH_REQ) from the initiator apparatus 100, the processing moves onto a device handle deletion control step S305. That is, the target apparatus 140 moves onto the device handle deletion control step S305 to disconnect the logical connection between the initiator apparatus 100 and the target device.

2.2.5 Device Handle Deletion Control Step S305

The second station 142 receives a delete device handle request (DEL_DH_REQ) #1 from the initiator apparatus 100 via the station-to-station network 170. The second station 142 causes the device handle control unit 433 to judge, with reference to the configuration information management table 440, whether or not the configuration information of the target device is stored in the configuration information management table 440. In this operation sequence, it is judged that the configuration information management table 440 stores the configuration information of the target device. The second station 142 causes the device handle control unit 433 to overwrite the destination ID 611 and the source ID 612 of the delete device handle request #1 with the device IDs of the second host 141 and the second station 142, respectively. As a result of overwriting the destination ID 611 and the source ID 612, a delete device handle request (DEL_DH_REQ) #2 is obtained. The second station 142 then transmits the delete device handle request #2 to the second host 141 via the local bus 150 of the second local network 140A. Note that the delete device handle response #2 corresponds to a notification that indicates the reception of the delete device handle request.

The second host 141 receives the delete device handle request #2 from the second station 142 and controls the device handle control unit 433 of the second station 142 in accordance with the delete device handle request. The second station 142 then causes the device handle control unit 433 to invalidate the configuration information of the target device held in the configuration information management table 440.

The second host 141 issues a response to the get device handle request #2 to the second station 142. Note that the response to the delete device handle request #2 is a delete device handle response (DEL_DH_ACK) #2 that includes a result flag indicating whether or not the configuration information of the target device has been successfully invalidated (the result flag in this example indicates success). Here, the destination ID 611 and the source ID 612 of the delete device handle request #2 are the device IDs of the second station 142 and the second host 141, respectively. The second station 142 receives the delete device handle response #2 via the local bus 150 of the second local network 140A. Then, the second station 142 causes the device handle control unit 433 to transmit the delete device handle response #2 thus received to the initiator apparatus 100 via the station-to-station network 170. The second station 142 returns the command transmission right, which have been handed over from the second host 141, to the second host 141. That is, the second host 141 retrieves the command transmission right from the second station 142. Consequently, the second station 142 is no longer in position to relay a transaction to and from the target device via the local bus 150 of the second local network 140A. This disconnects the logical connection between the initiator apparatus 100 and the target device.

The second host 141 issues a delete device handle response that includes a result flag indicating whether or not the configuration information of the target device has been successfully invalidated. In response, the second station 142 relays the delete device handle response to the initiator apparatus 100. Instead of the above procedure, the following is possible, for example. That is, with the use of a control command (CCMD), for example, the second host 141 may instruct the second station 142 to issue the delete device handle response that includes a result flag indicating whether or not the configuration information of the target device has been successfully invalidated. Upon receipt of the instruction, the second station 142 causes the device handle control unit 333 to issue a delete device handle response that includes the result flag. The second station 142 then transmits the delete device handle response to the initiator apparatus 100 via the station-to-station network 170.

2.2.6 Station-to-Station Network Disconnection Step S306

The second host 141 controls the second station 142, and the second station 142 disconnects the physical connection between the target apparatus 140 and the initiator apparatus 100 via the station-to-station network 170.

2.3 Operation Flow of Second Station 142 in Target Apparatus 140

Figure 12:
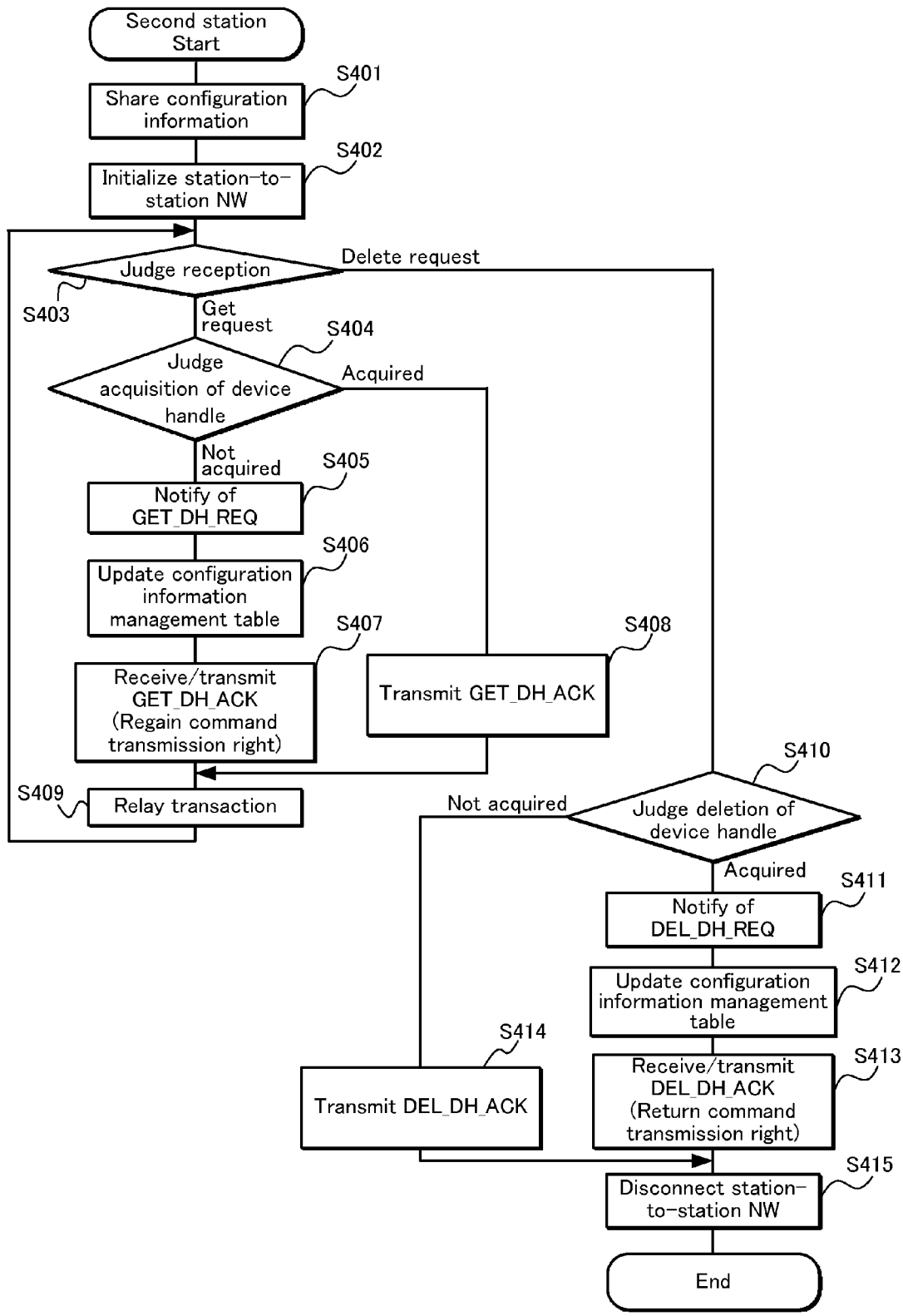
FIG. 12 is an operation flowchart of a second station included in the target apparatus shown in FIG. 1.

FIG. 12 is a flowchart showing an operation flow of the second station 142 in the target apparatus 140 shown in FIG. 1.

The second station 142 causes the configuration information sharing unit 431 to share the pieces of configuration information shown in FIGS. 5A and 5B with the second host 141 (Step S401). Under the control by the second host 141, the second station 142 causes the station-to-station network initializing unit 432 to initialize the station-to-station network 170. The second station 142 then establishes physical connection between the target apparatus 140 and the initiator apparatus 100 (Step S402).

On receiving a get device handle request (S403: Get request), the second station 142 moves onto Step S404. On the other hand, on receiving a delete device handle request (S403: Delete request) the second station 142 moves onto Step S410.

The second station 142 causes the device handle control unit 433 to judge whether the configuration information corresponding to the device handle number included in the get device handle request has already been acquired or not, with reference to the configuration information management table 440 (Step S404).

When the configuration information has not yet been acquired (Step S404: Not acquired), the second station 142 moves onto Step S405. The second station 142 causes the device handle control unit 433 to overwrite the destination ID 611 and the source ID 612 of the received get device handle request with the device IDs of the second host 141 and the second station 142, respectively. The second station 142 transmits the get device handle request thus overwritten to the second host 141 (Step S405).

The second station 142 causes the device handle control unit 433 to receive the configuration information that includes the received device ID of the target device from the second host 141. The second station 142 stores the received configuration information that includes the device ID of the target device into the configuration information management table 440 in association with the device handle number (Step S406).

The second station 142 receives a get device handle response from the second host 141. The second station 142 causes the device handle control unit 433 to relay the received get device handle response to the initiator apparatus 100 via the station-to-station network 170. The second station 142 receives the command transmission right, which is handed over from the second host 141 (Step S407).

When the judgment indicates that the configuration information has already been acquired (Step S404: Acquired), the second station 142 moves onto Step S408. The second station 142 operates on its own to cause the device handle control unit 433 to issue a get device handle response that includes a result flag indicating that the configuration information of the target device has been successfully acquired. Note that the target device is the one that corresponds to the device handle number indicated in the get device handle request. The second station 142 transmits the get device handle response to the initiator apparatus 100 via the station-to-station network 170 (Step S408).

The second station 142 causes the transaction relay unit 434 to relay the transactions (Step S409).

The second station 142 causes the device handle control unit 433 to judge whether the configuration information of the target device is stored in the configuration information management table 440, with reference to the configuration information management table 440 (Step S410). That is, the second station 142 judges whether or not the configuration information of the target device has already been acquired.

When it is judged that the configuration information has already been acquired (Step S410: Acquired), the second station 142 moves onto Step S411. The second station 142 causes the device handle control unit 433 to overwrite the destination ID 611 and the source ID 612 of the received delete device handle request with the device IDs of the second host 141 and the second station 142, respectively. The second station 142 transmits the delete device handle request that is obtained as a result of overwriting the destination ID 611 and the source ID 612 to the second host 141 (Step S411).

The second station 142 is controlled by the second host 141 having received the delete device handle request. Then, the second station 142 causes the device handle control unit 433 to invalidate the configuration information of the target device stored in the configuration information management table 440 (Step S412).

The second station 142 receives a delete device handle response from the second host 141. The second station 142 then transmits the received delete device handle response to the initiator apparatus 100 via the station-to-station network 170 and returns the command transmission right to the second host 141 (Step S413).

When it is judged that the configuration information has not been acquired yet (S410: Not acquired), the second station 142 operates on its own to causes the device handle control unit 433 to issue a delete device handle response. The second station 142 then transmits the delete device handle response to the initiator apparatus 100 via the station-to-station network 170 (Step S414).

Under control by the second host 141, the second station 142 disconnects the connection of the station-to-station network 170 between the target apparatus 140 and the initiator apparatus 100 (Step S415).

2.4 Operation Flow of Second Host 141 in Target Apparatus 140

Figure 13:
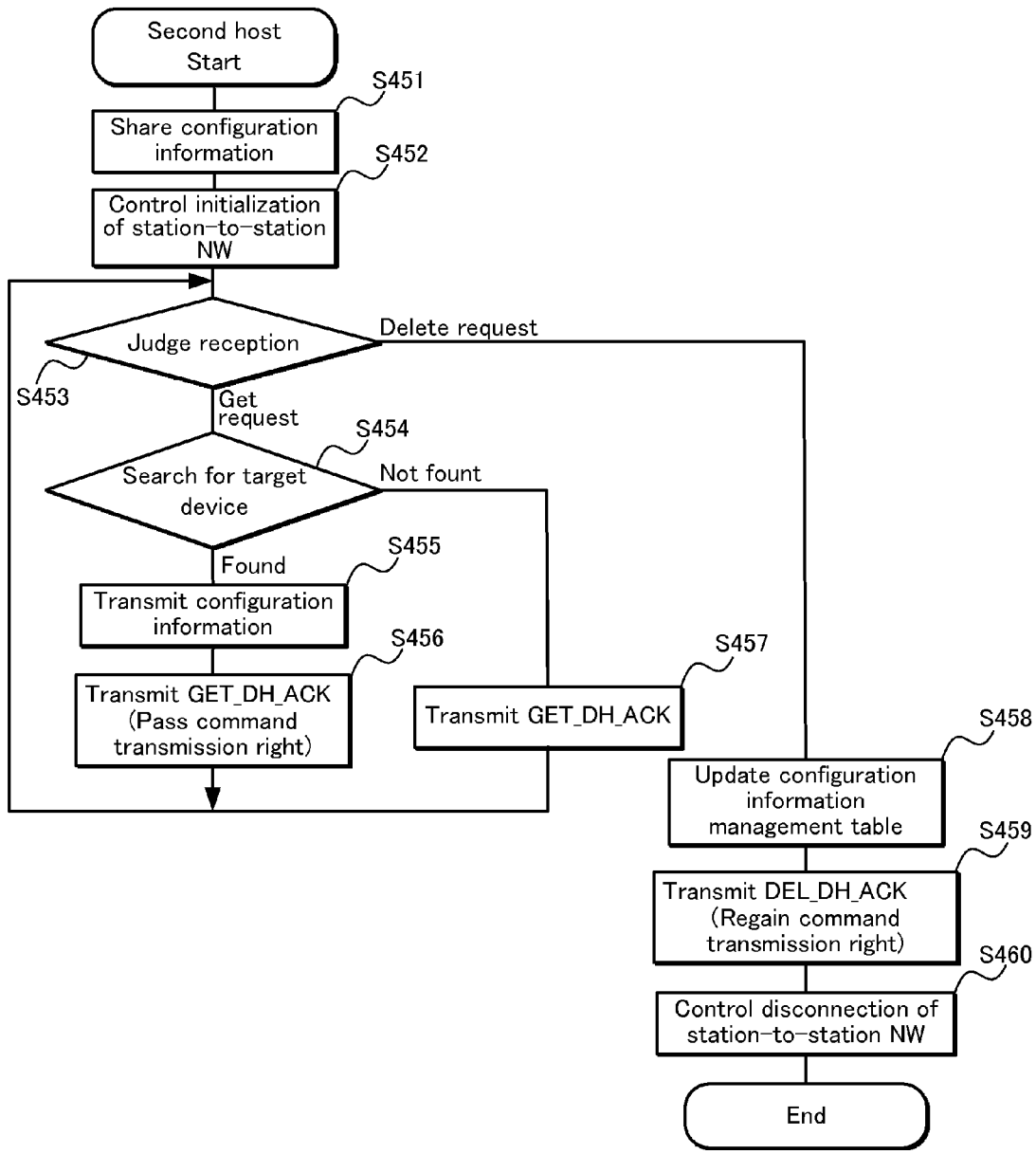
FIG. 13 is an operation flowchart of a second host included in the target apparatus shown in FIG. 1.

FIG. 13 is a flowchart showing an operation flow of the second host 141 in the target apparatus 140 shown in FIG. 1.

The second host 141 operates to share the pieces of configuration information shown in FIGS. 5A and 5B with the second devices 142-144 and stores the respective pieces of configuration information shared with the second devices 142-144 in the host controller 160 (Step S451). The second host 141 performs control to cause the second station 142 to initialize the station-to-station network 170 (Step S452).

On receiving a get device handle request (S453: Get request), the second host 141 moves onto Step S454. On the other hand, on receiving a delete device handle request (S453: Delete request), the second host 141 moves onto Step S458.

The second host 141 searches for the target device corresponding to the device handle number that is included in the get device handle request, from among the second devices 142-144 (Step S454).

When the target device corresponding to the device handle number included in the get device handle request is found among the second devices 142-144 (S454: Found), the second host 141 moves onto Step S455. The second host 141 transmits the configuration information of the target device held in the host controller 160 to the second station 142 (Step S455). The second host 141 transmits the get device handle response that includes a result flag indicating that the target device has been successfully found, and also hands over the command transmission right to the second station 142 (Step S456). The destination ID 611 and the source ID 612 of the get device handle response are the device IDs of the second station 142 and the second host 141, respectively.

On the other hand, when the target device corresponding to the device handle number included in the get device handle request is not found among the second devices 142-144 (S454: Not found), the second host 141 moves onto Step S457. The second host 141 transmits the get device handle response that includes a result flag indicating that the target device is not found (Step S457). The destination ID 611 and the source ID 612 of the get device handle response are the device IDs of the second station 142 and the second host 141, respectively.

On receiving the delete device handle request from the second station 142, the second host 141 causes the device handle control unit 433 of the second station 142 to invalidate the configuration information of the target device (Step S458). Note that the configuration information of the target device invalidated in this step remains stored in the second station 142 of the configuration information management table 440. The second host 141 transmits to the second station 142 a delete device handle response that includes a result flag indicating whether or not the configuration information of the target device has been successfully invalidated. As a consequence, the second host 141 retrieves the command transmission right from the second station 142 (Step S459). The destination ID 611 and the source ID 612 of the delete device handle response are the device IDs of the second station 142 and the second host 141, respectively.

The second host 141 performs control to cause the second station 142 to disconnect the station-to-station network 170 (Step S460).

2.5 Operation Sequence of Communication System

Figure 14:
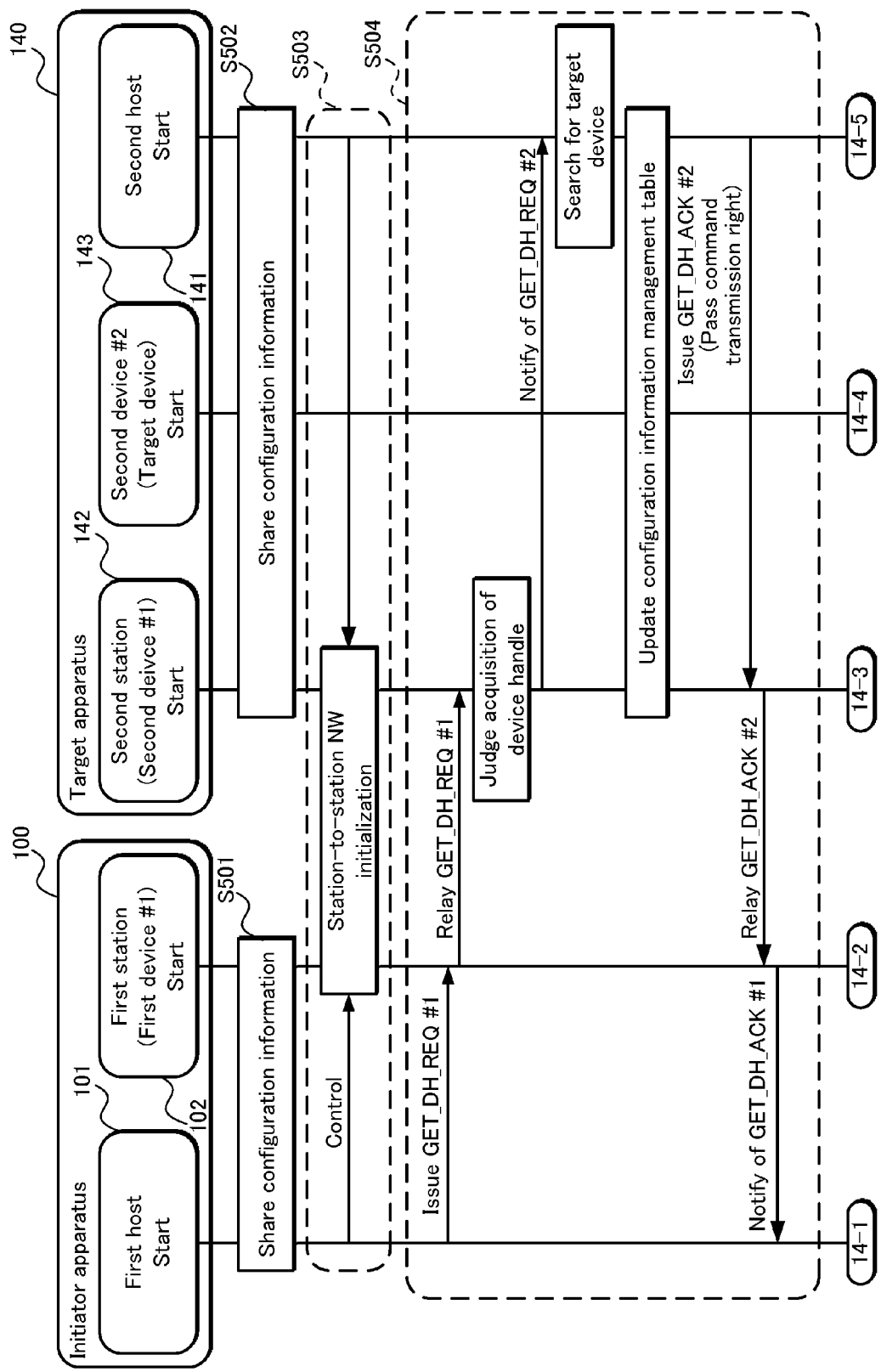
FIG. 14 is a view showing an operation sequence of the communication system shown in FIG. 1, starting from a configuration information sharing step to a device handle acquisition control step.
Figure 18:
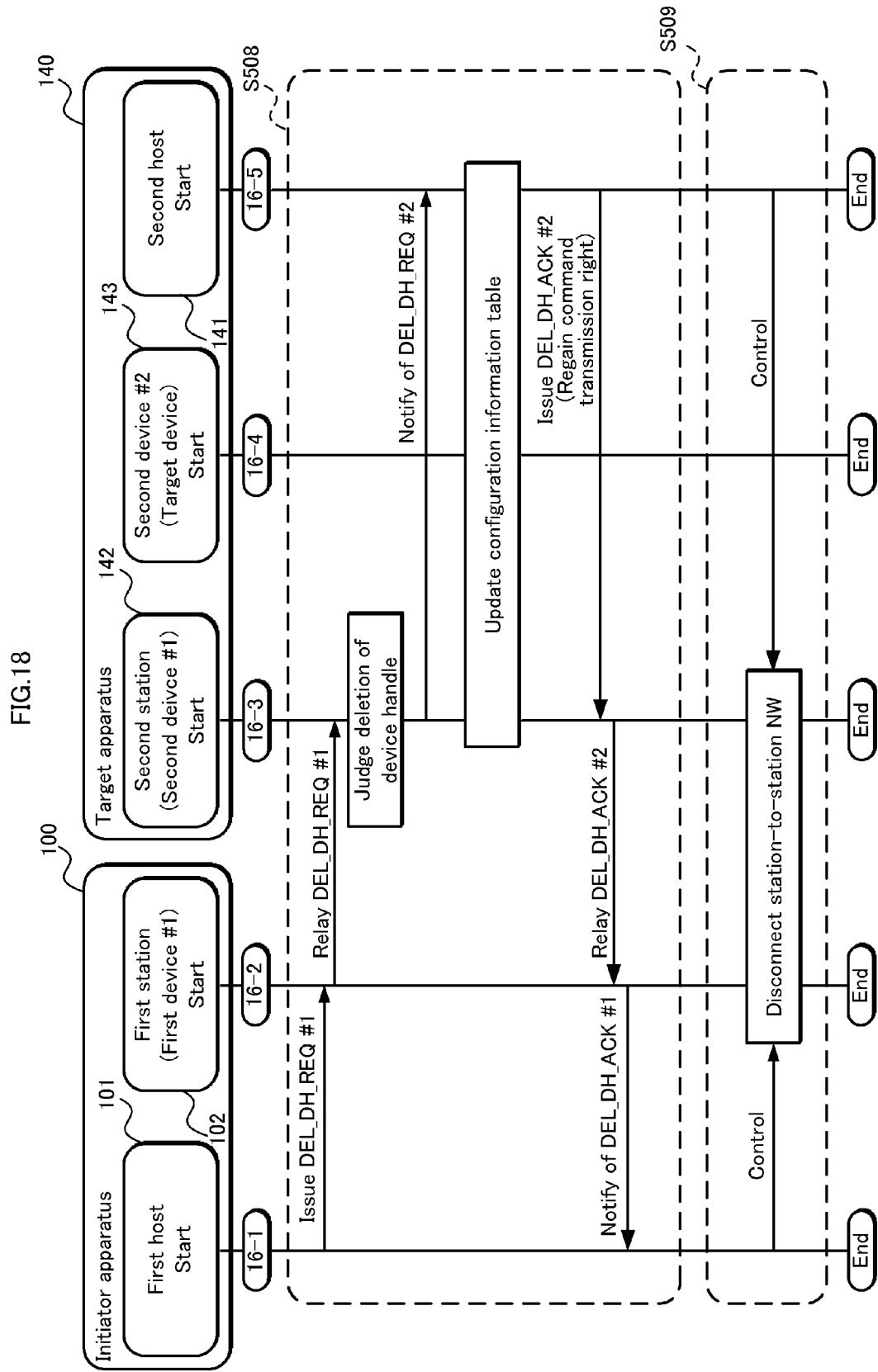
FIG. 18 is a view showing an operation sequence of the communication system shown in FIG. 1, starting from a device handle deletion control step to a station-to-station network disconnection step.

FIGS. 14 and 18 are views showing an operation sequence of the communication system that includes the initiator apparatus 100 and the target apparatus 140 shown in FIG. 1.

2.5.1 Configuration Information Sharing Steps S501 and S502 (FIG. 14)

As described in relation to Step S101, the first host 101 and the first devices 102-103 each operate to share the pieces of the configuration information shown in FIGS. 5A and 5B. Also, as described in relation to Step S301, the second host 141 and the second devices 142-144 each operate to share the pieces of the configuration information shown in FIGS. 5A and 5B.

2.5.2 Station-to-Station Network Initialization Step S503 (FIG. 14)

The first host 101 controls the first station 102, and the second host 141 controls the second station 142. The station-to-station network initializing unit 332 of the first station 102 as well as the station-to-station network initializing unit 432 of the second station 142 initializes the station-to-station network 170. Then, physical connection is established between the initiator apparatus 100 and the target apparatus 140.

2.5.3 Device Handle Acquisition Control Step S504 (FIG. 14)

The first host 101 issues a get device handle request (GET_DH_REQ) #1 that includes a device handle number to the first station 102. The first station 102 receives the get device handle request #1 from the first host 101. The first station 102 causes the device handle control unit 333 to relay the received get device handle request #1 to the target apparatus 140 via the station-to-station network 170.

The second station 142 receives the get device handle request #1 from the initiator apparatus 100 via the station-to-station network 170. The second station 142 causes the device handle control unit 433 to judge whether the configuration information of the target device corresponding to the device handle number included in the received get device handle request has already been acquired, with reference to the configuration information management table 440. In this operation sequence, it is assumed that that the configuration information of the target device corresponding to the device handle number is judged not to have been acquired yet. The second station 142 causes the device handle control unit 433 to overwrite the destination ID 611 and the source ID 612 of the get device handle request #1 with the device IDs of the second host 141 and the second station 142, respectively. As a result of overwriting the destination ID 611 and the source ID 612, a get device handle request (GET_DH_REQ) #2 is obtained. The second station 142 then transmits the get device handle request #2 to the second host 141.

On receiving the get device handle request #2 from the second station 142, the second host 141 searches for the target device corresponding to the device handle number included in the get device handle request #2, from among the second devices 142-144. In this operation sequence, the second host 141 selects the second device 143 (second device #2) as the target device. The second host 141 transmits the configuration information of the target device (second device 143) held in the host controller 160 to the second station 142. The second station 142 receives the configuration information of the target device and causes the device handle control unit 433 to store the configuration information of the target device 143 into the configuration information management table 440 in association with the device handle number.

The second host 141 transmits to the second station 142 a get device handle response (GET_DH_ACK) #2 that includes a result flag indicating that the target device has been successfully found. As a consequence, the second host 141 hands over the command transmission right, which is the right to transmit commands to the target device, to the second station 142. The second station 142 receives the get device handle response #2 via the local bus 150 of the second local network 140A. Then, the second station 142 transmits the get device handle response #2 to the initiator apparatus 100 via the station-to-station network 170. As a consequence, the second station 142 receives the command transmission right, which is the right to transmit commands to the target device, from the second host 141.

The first station 102 receives the get device handle response (GET_DH_ACK) #2 from the target apparatus 140 via the station-to-station network 170. The get device handle response #2 received herein includes a result flag indicating that the target device has been successfully found. The first station 102 causes the device handle control unit 333 to overwrite the destination ID 611 and the source ID 612 of the get device handle response #2 with the device IDs of the first host 101 and the first station 102, respectively. As a result of the overwriting the destination ID 611 and the source ID 612, a get device handle response (GET_DH_ACK) #1 is obtained. The first station 102 then returns the get device handle response #1 to the first host 101 via the local bus 110 of the first local network 100A.

The first host 101 receives the get device handle response #1 and checks the result flag included in the received get device handle response #1 to confirm whether or not logical connection with the target device included in the target apparatus 140 has been successfully established. In this example, the first host 101 confirms that logical connection has been successfully established with the target device corresponding to the device handle number included in the get device handle request.

Figure 15:
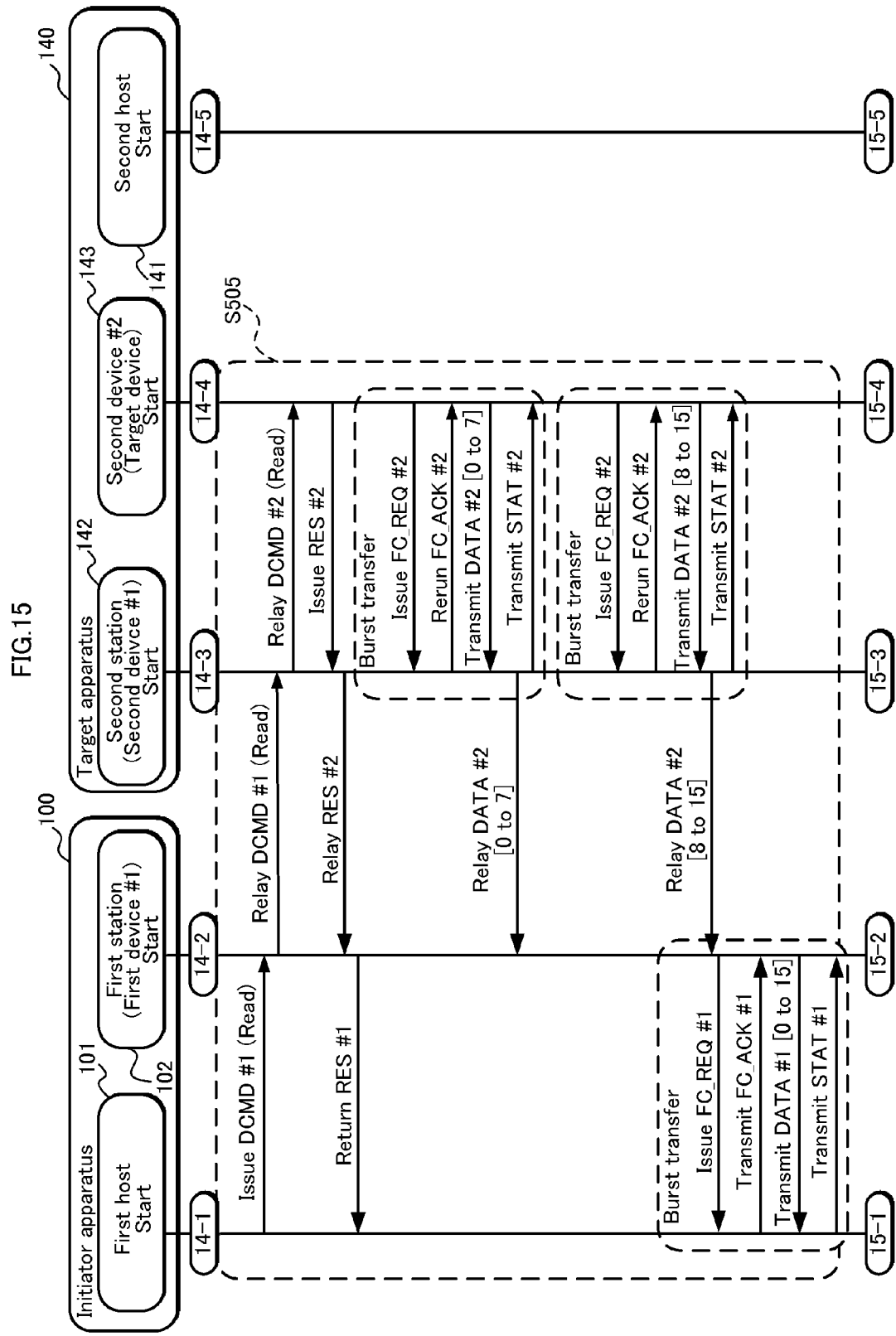
FIG. 15 is a view showing an operation sequence of the communication system shown in FIG. 1, the operation sequence related to a data read transaction in the transaction execution (relay) step.

2.5.4 Data Read Transaction Execution (Relay) Step S505 (FIG. 15)

2.5.4.1 Command-Response

The first host 101 has selected the first station 102 as the target device. The first host 101 issues a data command (DCMD) #1 that includes the destination ID 611 and the source ID 612 set to the device IDs of the first station 102 and the first host 101, respectively, and also includes the R/W flag 710 set to "read". The first host 101 also sets the tag ID 613 to the device handle number in order to allow the transaction relay unit 433 of the second station 142 to recognize the destination of the command. The first station 102 receives the data command #1 and causes the transaction relay unit 334 to relay the received data command #1 to the second station 142 via the station-to-station network 170.

The second station 142 receives the data command #1 from the first station 102 of the initiator apparatus 100 via the station-to-station network 170. Here, through the device handle acquisition control Step S503, the second station 142 acquires from the second host 141 the configuration information of the second device 143 (second device #2) being the target device. Then, the second station 142 receives the command transmission right. The second station 142 overwrites the destination ID 611 and the source ID 612 of the data command #1 received via the station-to-station network 170 with the device IDs of the target device 143 and the second station 142, respectively. As a result of overwriting the destination ID 611 and the source ID 612, a data command (DCMD) #2 is obtained. The second station 142 then causes the transaction relay unit 434 to relay the data command (DCMD) #2 to the target device 143. Note that the tag ID 613 included in the data command #1 received by the second station 102 is set to indicate the device handle number of the target device. The transaction relay unit 434 sets the destination ID 611 of the data command #2 to the device ID that is included in the piece of configuration information stored in the configuration information management table 440 in association with the device handle number specified by the tag ID 613.

The target device 143 receives the data command #2 and transmits a response to the data command #2 to the second station 142. More specifically, the response to be transmitted is a response (RES) #2 that includes the device IDs of the second station and the target device as the destination ID 611 and the source ID 612, respectively. Here, to the tag ID 613 of the response #2, the same value as the tag ID 612 of the data command #2 is written. The second station 142 receives the response #2 to the data command #2 from the target device 143. The second station 142 then causes the transaction relay unit 434 to relay the received response #2 to the first station 102 via the station-to-station network 170.

The first station 102 receives the response #2 via the station-to-station network 170. The first station 102 then causes the transaction relay unit 334 to overwrite the destination ID 611 and the source ID 612 of the received response #2 with the device IDs of the first host 101 and the first station 102, respectively. As a result of overwriting the destination ID 611 and the source ID 612, a response (RES) #1 is obtained. The first station 102 then transmits the response #1 to the first host 101, in response to the data command #1 received from the first host 101.

2.5.4.2 Data Transfer (Read)

The target device 143 prepares a flow control request (FC_REQ) #2 that includes the destination ID 611 and the source ID 612 set to indicate the device IDs of the second station 142 and the target device 143, respectively. Note that the second station 142 substitutes for the second host 141. The target device 143 issues the thus prepared flow control request #2 to the second station 142. The second station 142 receives the flow control request #2. The second station 142 returns to a flow control response (FC_ACK) #2 to the target device 143. The flow control response #2 is prepared by overwriting the destination ID 611 and the source ID 612 with the device IDs of the target device 143 and the second station 142, respectively. Through the above, the target device 143 and the second station 142 that substitutes for the second host 141 can mutually confirm the buffer status.

The target device 143 then starts transmitting, to the second station 142, data packets (DATA) #2 equivalent to the burst size. The data packets #2 are transmitted with the destination ID 611 and the source ID 612 set to indicate the device IDs of the second station 142 and the second target device 143, respectively. In this example, it is assumed the maximum packet size (Max Packet Size) specified by the configuration information of the target device is 512 bytes and the maximum burst number (Max Burst Num) is "8".

That is, the data packets #2[0] through [7], which amounts to 4 Kbytes, are transmitted in a burst. After completing the transmission of 4 Kbyte data, the second station 142 transmits to the target device 143 the status (STAT) #2 that includes information indicating the reception result of the data transmitted.

The second station 142 causes the transaction relay unit 434 to relay the burst data from the target device 143 to the first station 102 via the station-to-station network 170. Note that this burst transfer is to send the data packets #2[0] through [7].

Subsequently, the target device 143 and the second station 142 repeat burst transfers until the amount of data transferred reaches the transfer size 712 specified in the data command #2. The second station 142 causes the transaction relay unit 434 to relay the received burst data to the first station 102 via the station-to-station network 170.

The first station 102 prepares a flow control request (FC_REQ) #1 with the destination ID 611 and the source ID 612 set to the device IDs of the first host 101 and the first station 102, respectively. The first station 102 issues the flow control request #1 thus prepared to the first host 101. The first host 101 receives the flow control request #1 from the first station 102. The first host 101 then returns, to the first station 102, a flow control response (FC_ACK) #1 with the destination ID 611 and the source ID 612 set to the device IDs of the first station 102 and the first host 101, respectively. Through the above, the first station 102 and the first host 101 mutually confirm the buffer status.

Note that the burst transfer size between the first host 101 and the first station 102 both within the initiator apparatus 100 is determined through the configuration information sharing Step S501, independently of the target apparatus 140. For example, suppose that the configuration information of the first station 102 specifies the maximum packet size of 512 bytes and the maximum burst number of "16". Then, the burst transfer size is determined to be 8 Kbytes. That is, the first station 102 receives burst data in two burst transfers each sending 4 Kbytes via the station-to-station network 170 and causes the transaction relay unit 334 to transmit to the first host 101 the burst data received in the two burst transfers. That is, the burst data to be transferred is 8 Kbyte data (data packets (DATA) #1[0] through [15]) that is received in the unit of 4 Kbytes in each of two burst transfers. After completing the transmission of 8 Kbyte data in total, the first host 101 transmits the status (STAT) #2 that includes information indicating the reception result of the data transmitted to the first station 102.

Figure 16:
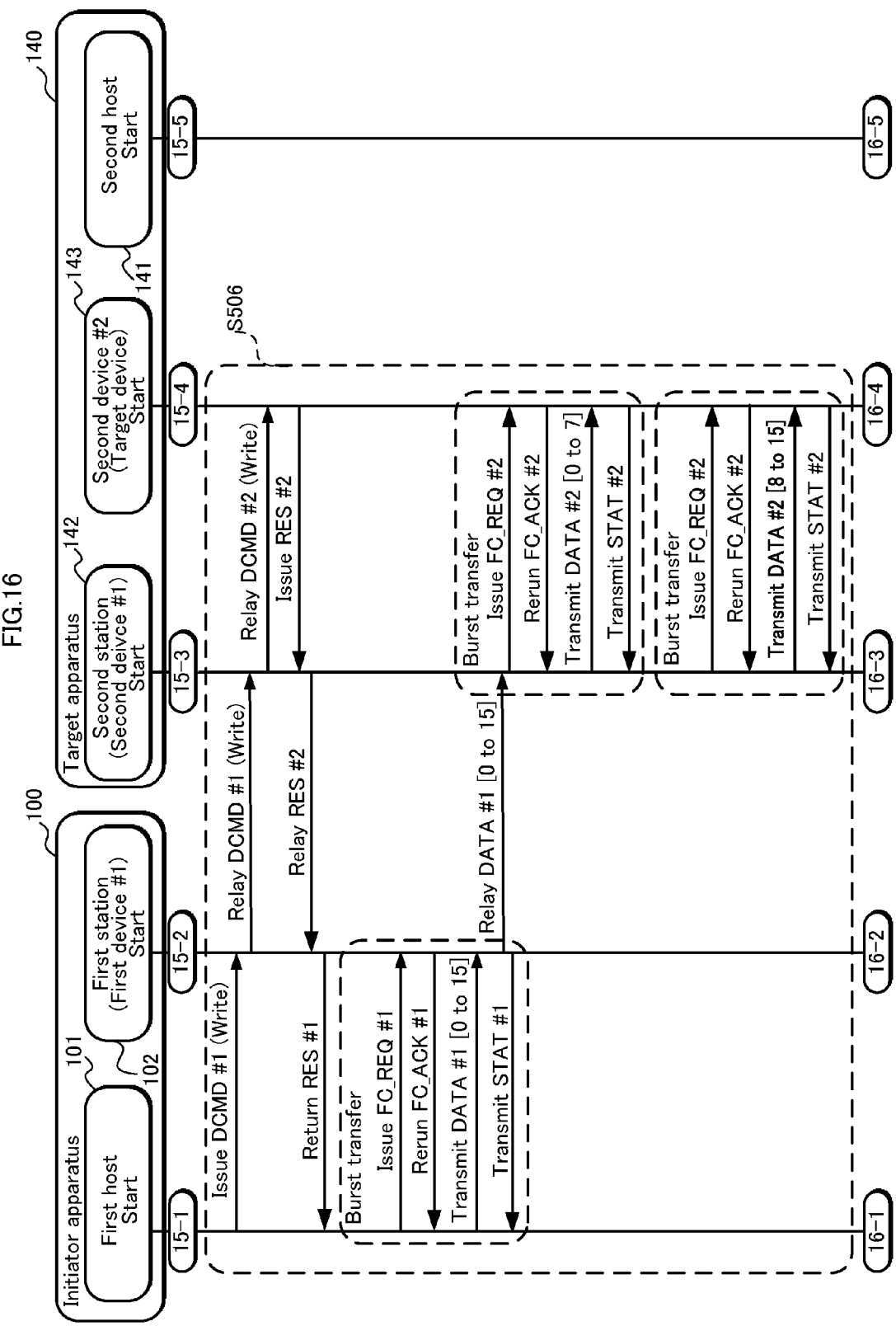
FIG. 16 is a view showing an operation sequence of the communication system shown in FIG. 1, the operation sequence related to a data write transaction performed in the transaction execution (relay) step.

2.5.5 Data Write Transaction Execution (Relay) Step S506 (FIG. 16)

2.5.5.1 Command-Response

The [command-response] procedure in the data write transaction is similar to that of the data read transaction as for the portions relevant to the present invention. Therefore, a description thereof is omitted here. The data write transaction differs from the data read transaction with respect to the [command-response] procedure in that the R/W flag 710 is set to "write" instead of "read".

2.5.5.2 Data Transfer (Write)

The first host 101 has selected the first station 102 as the target device. The first host 101 then prepares a flow control request (FC_REQ) #1 with the destination ID 611 and the source ID 612 set to the device IDs of the first station 102 and the first host 101, respectively. The first host 101 issues the thus prepared flow control request #1 to the first station 102. The first station 102 receives the flow control request #1 from the first host 101. The first station 102 then returns, to the first host 101, a flow control response (FC_ACK) #1 with the destination ID 611 and the source ID 612 set to the device IDs of the first host 101 and the first station 102, respectively. Through the above, the first host 101 and the first station 102 mutually confirm the buffer status.

The first host 101 then transmits data packets (DATA) #1[0] through [15], which amount to the burst transfer size of 8 Kbytes, to the first station 102. Note that the data packets (DATA) #1[0] through [15], which amount to the burst transfer size of 8 Kbytes, have the destination ID 611 and the source ID 612 set to the device IDs of the first station 102 and the first host 101, respectively. The first host 101 sets the tag ID 613 to indicate the device handle number in order to allow the transaction relay unit 433 of the second station 142 to recognize the destination of the command. After completing the transfer of 8 Kbyte data, the first station 102 transmits the status (STAT) #1 that includes information indicating the reception result of the data transmitted to the first host 101.

The first station 102 causes the transaction relay unit 334 to relay the burst data received from the first host 101 to the second station 142 via the station-to-station network 170. Note that this burst transfer is to send the data packets #1[0] through [15].

Subsequently, the first host 101 and the first station 102 repeat burst transfers until the amount of transferred data reaches the transfer size 712 specified in the data command (DCMD). The first station 102 causes the transaction relay unit 334 to relay the received burst data to the second station 142 via the station-to-station network 170.

Here, the second station 142 operates in substitution for the second host 141. The second station 142 prepares a flow control request (FC_REQ) #2 with the destination ID 611 and the source ID 612 set to the device IDs of the target device 143 and the second station 142, respectively. The second station 142 issues the thus prepared flow control request #2 to the target device 143. Consequently, the target device 143 receives the flow control request #2. The target device 143 then returns, to the second station 142, a flow control response (FC_ACK) #2 with the destination ID 611 and the source ID 612 set to the device IDs of the second station 142 and the target device 143, respectively. Through the above, the target device 143 ant the second station 142 that substitutes for the second host 141 can mutually confirm the buffer status.

The second station 142 receives burst data (data packets #1[0] through [15]) from the first station 102. The second station 142 causes the transaction relay unit 434 to relay the received burst data as data packets (DATA) #2 to the target device 143. The data packets (DATA) #2 are transmitted with the destination ID 611 and the source ID 612 set to the device IDs of the target device 143 and the second station 142, respectively. Note that the tag ID 613 included in the data packet #1 received by the second station 142 is set to the device handle number of the target device. The transaction relay unit 434 sets the destination ID 611 of the data command #2 to the device ID that is included in the piece of configuration information stored in the configuration information management table 440 in association with the device handle number specified by the tag ID 613. After completing the initial data transfer, the target device 143 transmits, to the second station 142, the status (STAT) #2 that includes information indicating the reception result of the data transfer.

As described above, the burst transfer size between the second station 142 and the target device 143 is equal to 4 Kbytes. Therefore, the second station 142 receives 8 Kbyte burst data in a wireless communication buffer of the station-to-station network interface 163. The second station 142 then transfers the received 8 Kbyte data to the buffer of the local network interface 162a by repeating a burst transfer of sending 4 Kbyte data. In repeating the buffer transfer, the second station 142 needs to place the subsequent burst transfer from the first station 102 in a wait state until a sufficient buffer space becomes available in the wireless commutation buffer of the station-to-station network interface 163.

Figure 17:
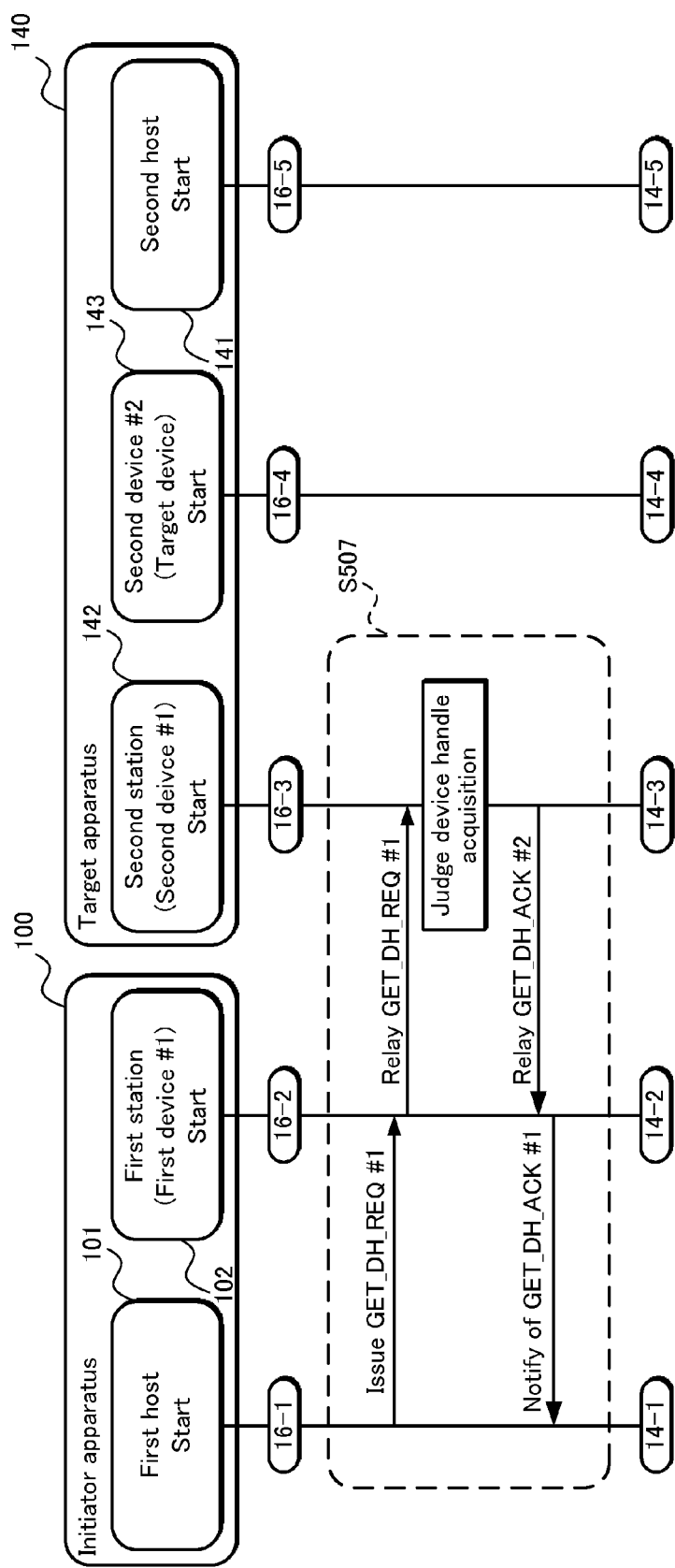
FIG. 17 is a view showing an operation sequence of the communication system shown in FIG. 1, the operation sequence related to an operation for switching to a device handle already acquired in the device handle acquisition control step.

2.5.6 Device Handle Acquisition Control Step S507 (Device Handle Switching) (FIG. 17)

To implement the device handle switching, the first host 101 issues a get device handle request (GET_DH_REQ) #1 to the first station after changing the device handle number. The first station 102 receives the get device handle request #1 and relays the received get device handle request #1 to the target apparatus 140 via the station-to-station network 170.

The second station 142 receives the get device handle request #1 from the initiator apparatus 100 via the station-to-station network 170. The second station 142 causes the device handle control unit 433 to judge whether or not the configuration information of the target device corresponding to the device handle number included in the get device handle request #1 has already been acquired, with reference to the configuration information management table 440. In this operation sequence, it is assumed that the configuration information of the target device corresponding to the device handle number is judged to have been acquired. The second station 142 operates on its own to cause the device handle control unit 433 to return a response indicating the acquisition of the configuration information of the target device to the initiator apparatus 100 via the station-to-station network 170. That is, the second station 142 returns the acquisition response without requiring involvement of the second host 141. More specifically, the acquisition response of the configuration information of the target device is a get device handle response (GET_DH_ACK) #2 that includes a result flag indicating success.

The first station 102 receives a get device handle response (GET_DH_ACK) #2 from the target apparatus 140 via the station-to-station network 170. The get device handle response #2 received herein includes a result flag indicating that the target device has been successfully found. The first station 102 causes the device handle control unit 333 to overwrite the destination ID 611 and the source ID 612 of the get device handle response #2 with the device IDs of the first host 101 and the first station 102, respectively. As a result of the overwriting the destination ID 611 and the source ID 612, a get device handle response (GET_DH_ACK) #1 is obtained. The first station 102 then returns the thus obtained get device handle response #1 to the first host 101 via the local bus 110 of the first local network 100A.

The first host 101 receives the get device handle response #1 and checks the result flag included in the received get device handle response #1 to confirm whether or not logical connection with the target device included in the target apparatus 140 has been successfully established. In this example, the first host 101 confirms that logical connection has been successfully established with the target device corresponding to the device handle number included in the get device handle request.

The subsequent operation sequence is the same as that shown in FIGS. 15 and 16.

2.5.7 Device Handle Deletion Step S508 (FIG. 18)

The first host 101 transmits a delete device handle request (DEL_DH_REQ) #1 to the first station 102. The first station 102 receives the delete device handle request #1 from the first host 101. The first station 102 causes the device handle control unit 333 to relay the received delete device handle request #1 to the target apparatus 140 via the station-to-station network 170.

The second station 142 receives the delete device handle request #1 from the initiator apparatus 100 via the station-to-station network 170. The second station 142 causes the device handle control unit 433 to judge, with reference to the configuration information management table 440, whether or not the configuration information of the target device is stored in the configuration information management table 440. In this operation sequence, it is assumed that the configuration information management table 440 is judged to store the configuration information of the target device. The second station 142 causes the device handle control unit 433 to overwrite the destination ID 611 and the source ID 612 of the delete device handle request #1 with the device IDs of the second host 141 and the second station 142, respectively. As a result of overwriting the destination ID 611 and the source ID 612, a delete device handle request (GET_DH_REQ) #2 is obtained. Then, the second station 142 transmits the thus obtained delete device handle request #2 to the second host 141.

The second host 141 receives the delete device handle request #2 from the second station 142. In accordance with the delete device handle request #2, the second host 141 controls the device handle control unit 433 of the second station 142. The second station 142 causes the device handle control unit 433 to invalidate the configuration information of the target device held in the configuration information management table 440.

The second host 141 issues a response to the delete device handle request #2 to the second station 142. Note that the response to the delete device handle request #2 is a delete device handle response (DEL_DH_ACK) #2 that includes a result flag indicating whether or not the configuration information of the target device has been successfully invalidated (the result flag in this example indicates success). Note that the destination ID 622 and the source ID 612 included in the delete device handle response #2 are set to indicate the device IDs of the second station 142 and the second host 141, respectively. The second station 142 receives the delete device handle response #2 and controls the device handle control unit 433 to transmit the received delete device handle response #2 to the initiator apparatus 100 via the station-to-station network 170. The second station 142 returns the command transmission right, which has been handed over from the second host 141, to the second host 141. That is, the second host 141 retrieves the command transmission right from the second station 142.

The first station 102 receives the delete device handle response #2 that includes the above-described result flag from the target apparatus 140 via the station-to-station network 170. The first station 102 causes the device handle control unit 333 to overwrite the destination ID 611 and the source ID 612 of the delete device handle response #2 with the device IDs of the first host 101 and the first station 102, respectively. Then, the first station 102 causes the device handle control unit 333 to returns a response to the delete device handle request #1. More specifically, the response to the delete device handle request #1 is a delete device handle response (DEL_DH_ACK) #1 obtained by overwriting the destination ID 611 and the source ID 612.

The first host 101 receives the delete device handle response #1 and checks the result flag included in the received delete device handle response #1 to confirm whether or not the logical connection with the target device included in the target apparatus 140 has been successfully disconnected.

2.5.8 Station-to-Station Network Disconnection Step S509 (FIG. 18)

Here, the first host 101 controls the first station 102. In addition, the second host 141 controls the second station 142. The first station 102 and the second station 142 each operate to disconnect the physical connection with the station-to-station network 170.

According to the present embodiment, the respective pieces of configuration information of the devices included in each of the initiator apparatus 100 and the target apparatus 140 are retained after the configuration information sharing step. Therefore, anytime after completion of the station-to-station network disconnecting steps S106 and S306, the initiator apparatus 100 and the target apparatus 140 are allowed to start communication with any device in the other apparatus without having to go through the step for sharing the configuration information.

<<First Modification>>

The following describes a first modification of the embodiment of the present invention, with reference to the drawings. As shown in FIG. 17, when it is judged that the device handle has been acquired, the communication system can execute the device handle switching without requiring involvement of the second host 141.

In view of this, the first modification is conceived to collectively acquire a plurality of device handles through the device handle acquisition control step that immediately follows the station-to-station network initialization step. This modification reduces communication overhead required at the time of device handle switching.

Figure 19:
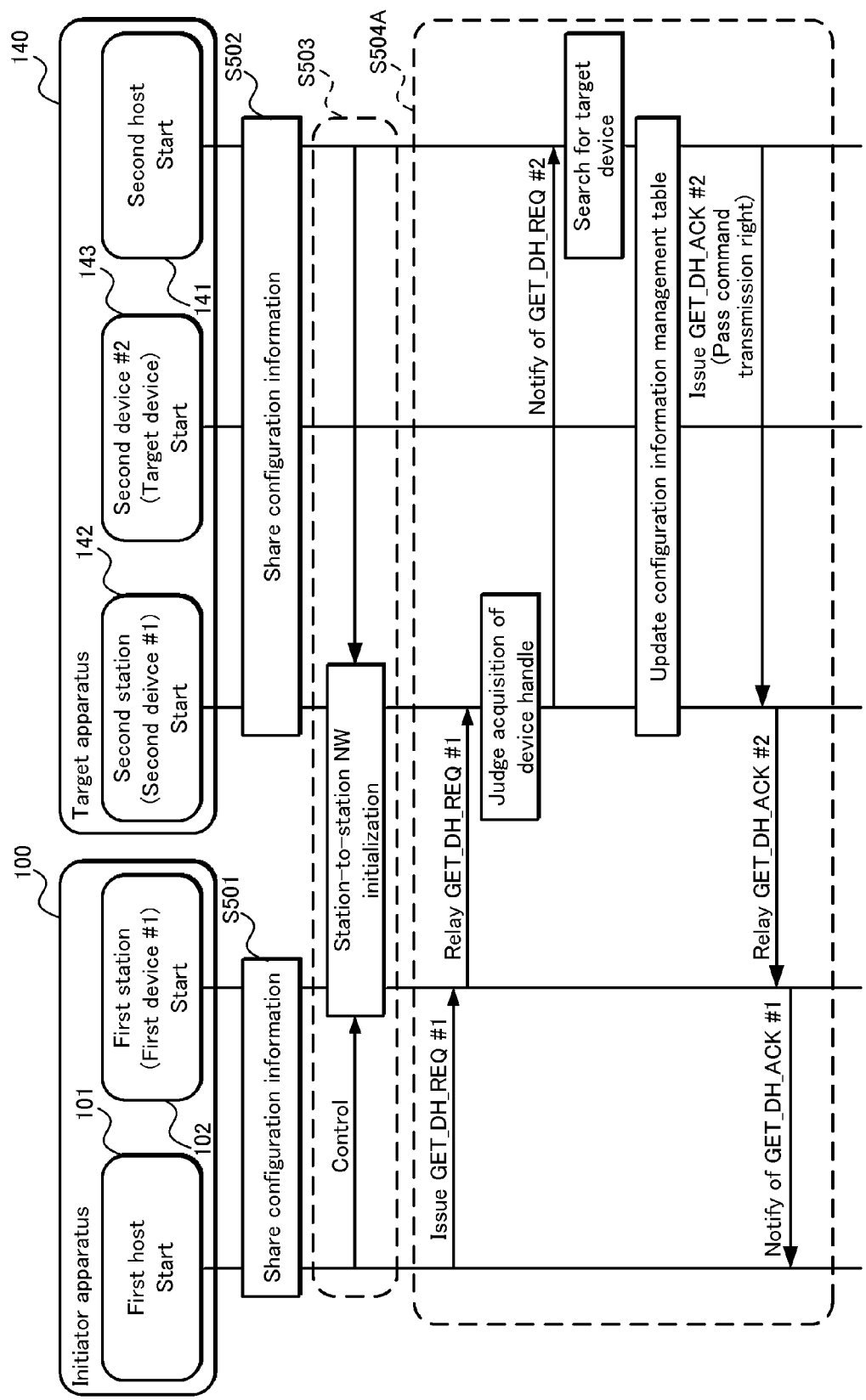
FIG. 19 is a view showing an operation sequence of a communication system according to a first modification, starting from a configuration information sharing step to a device handle acquisition control step that immediately follows a station-to-station network initialization step.

The following now describes the device handle acquisition control step S504A that immediately follows the station-to-station network initialization step, with reference to FIG. 19.

In order to collectively acquire a plurality of device handles, the first host 101 transmits a get device handle request (GET_DH_REQ) #1 that is for the collective acquisition to the first station 102. The get device handle request device #1 includes the device handle number set to "0", for example. The first station 102 receives the get device handle request #1 from the first host 101. The first station 102 causes the device handle control unit 333 to relay the received get device handle request #1 to the target apparatus 140 via the station-to-station network 170.

The second station 142 receives the get device handle request #1 from the initiator apparatus 100 via the station-to-station network 170. The second station 142 causes the device handle control unit 433 to judge whether the configuration information of the target device corresponding to the device handle number has already been acquired, with reference to the configuration information management table 440. In this operation sequence, it is assumed that the configuration information of the target device corresponding to the device handle number is judged to have not been acquired yet. The second station 142 causes the device handle control unit 433 to overwrite the destination ID 611 and the source ID 612 of the get device handle request #1 with the device IDs of the second host 141 and the second station 142, respectively. As a result of the overwriting the destination ID 611 and the source ID 612, a get device handle request (GET_DH_REQ) #2 is obtained. The second station 142 then transmits the thus obtained get device handle request #2 to the second host 141.

The second host 141 receives the get device handle request #2 from the second station 142. The device handle number included in the get device handle request #2 received herein is set to a value indicating collective acquisition. Consequently, the second host 141 searches for a plurality of target devices forming a target device group, based on the respective pieces of configuration information of the second devices 142-144 held in the host controller 160. In one simplest example of the target device group, all the second devices 142-144 are selected.

The second host 141 collectively transmits, to the second station 142, the respective pieces of the device of the target device group all in association with the device handle number. The second station 142 collectively receives the respective pieces of configuration information of the devices belonging to the target device group. The second station 142 causes the device handle control unit 433 to store the respective pieces of configuration information of the target devices belonging to the target device group into the configuration information management table 440 all in association with the device handle number. The device handle number is included, for example, in a get device handle response and specifies the respective devices belonging to the target device group, which will be described later.

The second host 141 issues a get device handle response (GET_DH_ACK) #2 to the second station and hands over the command transmission right to the second station #2. The second station 142 receives the get device handle response #2 and transmits the received get device handle response #2 to the initiator apparatus 100 via the station-to-station network 170. The second station 142 receives the command transmission right that is handed over from the second host 141. Here, the second host 141 transmits a get device handle response that includes information specifying each device in the target device group. The information specifying the respective devices of the target device group may be bitmap information representing the device IDs allocated to the devices. For example, to the second devices 142-144 shown in FIG. 1, the device IDs "1" through "3" are allocated, respectively. In addition, the bitmap information is information composed of a series of bits 1 through 3. One of the bits 1 through 3 corresponding to the device ID is set to "1", whereas the other bits are set to "0".

The first station 102 receives the get device handle response #2 from the target apparatus 140 via the station-to-station network 170. The first station 102 causes the device handle control unit 333 to overwrite the destination ID 611 and the source ID 612 of the get device handle response #2 with the device IDs of the first host 101 and the first station 102, respectively. As a result of overwriting the destination ID 611 and the source ID 612, a get device handle response (GET_DH_ACK) #1 is obtained. The first station 102 then returns the thus obtained get device handle response #1 to the first host 101 via the local bus 110 of the first local network 100A.

The first host 101 receives the get device handle response #1. With reference to the information specifying the target device group included in the get device handle response, the first host 101 recognizes the device handles which have already been acquired. Subsequently, the first host 101 issues a get device handle request with the device handle number set to indicate one of the values "1" through "3". As a consequence, the first host 101 can realize the device handle (target device) switching as shown in FIG. 17, without requiring involvement of the second host 141.

Note that the formation of the target device group is not limited to the way described above. Alternatively, for example, the get device handle request issued by the first host 101 may include a device type code, which is configuration information. Consequently, the second host 141 searches for a target device group formed of a plurality of target devices based on the respective pieces of configuration information of the second devices 142-144 held in the host controller 160. Based on the configuration information, all devices corresponding to the device type code included in the get device handle request are selected as belonging to the target device group.

Further, the second host 141 may include, in the get device handle response, not only the device ID represented by the bitmap information as described above but also the device type code of each device. In such a case, the second host 141 returns a get device handle response that includes a device list in which the device IDs and the device type codes of the second devices 142-144 are listed as shown in FIG. 20. As a consequence, the first host 101 is allowed to acquire a collective list of the device type codes and the device IDs of all the potential target devices.

<<Second Modification>>

The following now describes a second modification of the embodiment of the present invention, with reference to the drawings. The embodiment and first modification described above each require packets to be exchanged for acquisition of a device handle before initiating a transaction. The packets exchanged for acquisition of a device handle are a get device handle request (GET_DH_REQ) and get device handle response (GET_DH_ACK), for example.

According to the second modification, a command and a response exchanged in a normal transaction are treated as a get device handle request and get device handle response, respectively. This arrangement reduces the communication overhead.

With reference to FIGS. 21 and 22, the following describes a device handle acquisition control step in which a get device handle request and a delete device handle response are used as a command and a response, respectively.

1. Device Handle Acquisition Control Step S504B (where a Device Handle has not Yet been Acquired) (FIG. 21)

In a device handle acquisition control step S504B, the first station 102 issues a data command (DCMD) #1. The data command functions also as a get device handle request GET_DH_REQ #1. The first station 102 receives the data command #1 from the first host 101 and causes the device handle control unit 333 to relay the received data command #1 to the target apparatus 140 via the station-to-station network. Note that the device handle number that is necessary for the get device handle request is included in the data command using a reserved field or an additional field. In the case where the inclusion of such an additional field is difficult, the tag ID 613 shown in FIG. 6 may be used as the device handle number.

The second station 142 receives the data command #1 which functions also as the get device handle request #1 from the initiator apparatus 100 via the station-to-station network 170. The second station 142 judges, with reference to the configuration information management table 440, whether or not the configuration information of the target device corresponding to the device handle number included in the data command #1 has already been acquired. In this operation sequence, it is assumed that the configuration information of the target device corresponding to the device handle number is judged not to have been acquired yet.

Then, the second station 142 overwrites the destination ID 611 and the source ID 612 of the data command #1 with the device IDs of the second host 141 and the second station 142, respectively. As a result of overwriting the destination ID 611 and the source ID 612, a data command is obtained. The second station 142 then transmits to the second host 141 the thus obtained data commands as a notification indicating reception of the get device handle request.

The second host 141 receives from the second station 142 the data command as a notification indicating reception of the get device handle request. The second host 141 then searches for a target device in a manner similar to that described in the above embodiment and transmits the configuration information of the target device to the second station 142. In response, the second station 142 stores the configuration information of the target device into the configuration information management table 440 in association with the device handle number. Upon completion of the storage, the second host 141 instructs the second station 102 to issue a get device handle response and hands over the command transmission right to the second station 142. The second station 142 receives the instruction about the get device handle response and also receive the command transmission right.

The second station 142 overwrites the destination ID 611 and the source ID 612 of the data command #1 with the device ID of the target device 143 and the second station 142, respectively. As a result of overwriting the destination ID 611 and the source ID 612, a data command #2 is obtained. The second station 142 then transmits the data command #2 to the target device 143. The target device 143 receives the data command #2. In response to the data command #2, the target device 143 transmits a response #2 to the second station 142. The second station 142 adds, to the response #2 received from the target device 142, a result flag indicating that the target device has been successfully found. The second station 142 then transmits the response #2 that includes the result flag to the initiator apparatus 100 via the station-to-station network 170. Note that the response #2 transmitted here functions also as a get device handle response (GET_DH_ACK) #2.

Each of the device handle number and result flag that are necessary for the get device handle response is included in the response using a reserved field or an additional field, as in the case of the get device handle request. In the case where the inclusion of such an additional field is difficult, the tag ID 613 shown in FIG. 6 may be used as the device handle number and a NACK flag 720 may be used as the result flag.

The first station 102 receives the response #2 from the target apparatus 140 via the station-to-station network 170. Then, the first station 102 overwrites the destination ID 611 and the source ID 612 of the response #2 with the device IDs of the first host 101 and the first station 102, respectively. As a result of overwriting the destination ID 611 and the source ID 612, a get device handle response (GET_DH_ACK) #1 is obtained. The first station 102 then returns to the first host 101 the thus obtained response #1 that functions also as a notification indicating reception of the get device handle response #1. The first host 101 receives the response #1 and checks the result flag included in the received response #1 to confirm whether or not logical connection with the target device included in the target apparatus 140 has been successfully established.

2. Device Handle Acquisition Control Step S507B (where a Device Handle has already been acquired) (FIG. 22)

For switching the device handle, the first host 101 transmits a data command (DCMD) #1 to the first station 102 with the device handle number changed. Note that the data command #1 transmitted here functions also as a get device handle request. The first station 102 receives the data command #1 and transmits the received data command #1 to the target apparatus 140 via the station-to-station network 170.

The second station 142 receives the data command #1 from the second station 142 via the station-to-station network 170. The second station 142 judges, with reference to the configuration information management table 440, whether or not the configuration information of the target device corresponding to the device handle number included in the get device handle request has already been acquired. In this operation sequence, it is assumed that the configuration information of the target device corresponding to the device handle number is judged to have already been acquired. Then, the second station 142 overwrites the destination ID 611 and the source ID 612 of the data command #1 with the device IDs of the target device 143 and the second station 142, respectively. As a result of overwriting the destination ID 611 and the source ID 612, a data command #2 is obtained. The second station 142 transmits the thus obtained data command #2 to the target device 143. The target device 143 receives the data command #2. In response to the data command #2, the target device 143 transmits a response #2 to the second station 142. The second station 142 adds, to the response #2 received from the target device 142, a result flag indicating that the target device has been successfully found. The second station 142 then transmits the response #2 that includes the result flag to the initiator apparatus 100 via the station-to-station network 170. Note that the response #2 transmitted here functions also as a get device handle response (GET_DH_ACK) #2.

The first station 102 receives the response #2 from the target apparatus 140 via the station-to-station network 170. Then, the first station 102 overwrites the destination ID 611 and the source ID 612 of the response #2 with the device IDs of the first host 101 and the first station 102, respectively. As a result overwriting the destination ID 611 and the source ID 612, a response #1 is obtained. The first station 102 returns to the first host 101 the thus obtained response #1 that functions also as a reception notification of the get device handle response (GET_DH_ACK) #1.

The first host 101 receives the response #1 and checks the result flag included in the received response #1 to confirm whether or not logical connection with the target device included in the target apparatus 140 has been successfully established.

As described above, according to the second modification, a device handle is acquired through exchanging a data command and a response. For this reason, the second modification eliminates the need to exchange a data command and a response shown in FIGS. 15 and 16 in a subsequent data transfer.

<<Other Modifications>>

The present invention is not limited to the specific embodiments described above and may be practiced in any forms, including the following, that achieve the object of the present invention and other objects relevant to the object of the present invention.

(1) Memory Integrated Station

The second station 142 shown in FIG. 1 may be a memory integrated station into which a non-volatile memory module is integrated just like the second device 143. In such a case, in the configuration information sharing step, the second station 142 shares the two pieces of configuration information, one as a station and the other as a memory device, with the second host 141. The second station 142 (400) copies the configuration information of the memory device to the configuration information management table 440 in advance. This arrangement eliminates the need for the second station 142 to acquire the configuration information from the second host 141 when the second station 142 being a memory device is selected as the target device in the device handle acquisition step. Having been selected as the target device, the second station 142 relays data that is exchanged between the initiator apparatus 100 and the target apparatus 140 in the subsequent transaction execution (relay) step to and from the internal non-volatile memory module.

(2) USB

According to the USB protocol, the source ID 612 shown in FIG. 6 is not defined. Therefore, a response from a device is always returned to the host. Suppose, for example, that the second station 142 substituting for the second host 141 issues a data command to a target device in the transaction execution (relay) step shown in FIG. 15 or 16. In this case, it is possible that a response to the data command is returned to the second host 141, rather than to the second 142.

In view of the above possibility, when handing over the command transmission right to the second station 142, the second host 141 switches on a USB hub as shown in FIG. 2B from the port connected with the second host 141 to the port connected with the second station 142. As a result, the second station 142 is physically allowed to substitute for the host of the target device.

Similarly, when retrieving the command transmission right from the second station 142, the second host 141 switches the port connection of the USB hub back to the original state. This physically allows the second host 141 to act as the host of the target device.

(3) Additional Notes

According to the embodiment and modifications described above, the station having received a packet via the station-to-station network 170 overwrites the destination ID 611 and the source ID 612 as necessary. Alternatively, however, the overwriting of the destination ID 611 and the source ID 612 may be performed as necessary by a station that transmits a packet via the station-to-station network 170.

INDUSTRIAL APPLICABILITY

The present invention realizes to connect different networks each having a host and to achieve a transparent transaction between devices belonging to the different networks. Therefore, the present invention is of great use as it provides a station, target apparatus, initiator apparatus, and communication system as well as a communication method.

REFERENCE SIGNS LIST 100 initiator apparatus
100A first local network
101 first host
102 first device (first station)
103 first device
110 local bus
120 host controller
121 CPU
122a, 122b local network interface
123 station-to-station network interface
140 target apparatus
140A second local network
141 second host 142 second device (second station)
143 second device
144 second device
150 local bus
160 host controller
161 CPU
162a-162c local network interface
163 station-to-station network interface
164 non-volatile memory module
300 first station
310 local bus
311 local network interface
320 station-to-station network
321 station-to-station network interface
330 control unit
331 configuration information sharing unit
332 station-to-station network initializing unit
333 device handle control unit
334 transaction relay unit
400 second station
410 local bus
411 local network interface
420 station-to-station network
421 station-to-station network interface
430 control unit
431 configuration information sharing unit
432 station-to-station network initializing unit
433 device handle control unit
434 transaction relay unit
440 configuration information management table

The invention claimed is:

1. A station that is connected to a local bus and that is for relaying wireless communications transmitted to and from another device that is not connected to the local bus, the local bus being connected to a host, the station comprising:
a first transmission interface for connecting to the local bus;
a second transmission interface for wirelessly connecting to the other device;
a configuration information sharing unit configured to share configuration information of the station with the host, the configuration information being for use in communication via the local bus;
a device handle control unit configured to, in response to a get device handle request received from the other device,
acquire configuration information of a target device from the host, the target device being connected to the local bus, and
return a get device handle response that is a response to the get device handle request to the other device, and thereby receive a command transmission right from the host, the command transmission right being a right to transmit commands to the target device; and
a transaction relay unit configured to relay a command received from the other device and a transaction specified by the command to the target device, wherein
the local bus is part of a star-type of logical topology having the host at a center thereof, only the host initially having the command transmission right,
the relay of the transaction by the transaction relay unit is carried out based on the configuration information of the target device acquired by the device handle control unit and without involvement of the host,
the target device is a memory device,
the transaction is one of a read transaction for reading data from the target device and a write transaction for writing data into the target device,
the configuration information of the target device includes information indicating burst size relating to data transfer between the station and the target device,
in the case where the transaction is the read transaction, the transaction relay unit receives data from the target device, and each time receiving the data by the burst size from the target device, the transaction relay unit transmits a reception result to the target device, and transmits the data received from the target device to the other device via the second transmission interface, and
in the case where the transaction is the write transaction, the transaction relay unit receives data from the other device via the second transmission interface, and transmits the data received from the other device to the target device, and each time transmitting the data by the burst size to the target device, the transaction relay unit receives a reception result from the target device.

2. The station according to claim 1, further comprising:
a configuration information management table, wherein the device handle control unit is configured to
acquire the configuration information of the target device from the host by transmitting to the host a notification indicating receipt of the get device handle request, and
store the acquired configuration information of the target device into the configuration information management table, and
the get handle response includes a result flag indicating whether or not the configuration information of the target device has been successfully acquired.

3. The station according to claim 2, wherein
the device handle control unit is configured to, in response to a delete device handle request received from the other device,
transmit a notification indicating receipt of the delete device handle request to the host and invalidate the configuration information of the target device stored in the configuration information management table, and
return a delete device handle response that is a response to the delete device handle request to the other device.

4. The station according to claim 2, wherein
each of the get device handle request and the notification indicating receipt of the get device handle request includes a device handle number for identifying the target device, and
the device handle control unit is configured to store into the configuration information management table the configuration information of the target device in association with the device handle number, the configuration information having been received from the host in response to the notification indicating receipt of the get device handle request and corresponding to the device handle number.

5. The station according to claim 4, wherein
the device handle control unit is configured to transmit the notification indicating receipt of the get device handle request to the host, only when the configuration information management table does not store the configuration information of the target device corresponding to the device handle number that is included in the received get device handle request.

6. The station according to claim 2, wherein
the device handle control unit is configured to
   collectively acquire respective pieces of configuration information of devices of a target device group from the host in response to the notification indicating receipt of the get device handle request, and
   collectively store the respective pieces of configuration information of the devices of the target device group into the configuration information management table.

7. The station according to claim 6, wherein
the get device handle response includes information specifying each device of the target device group.

8. The station according to claim 7, wherein
the get device handle response further includes a device type code for each device of the target device group, each device type code identifying a device type of the corresponding device.

9. The station according to claim 2, wherein
each of the get device handle request and the notification indicating receipt of the get device handle request includes a device type code identifying a device type, and
the device handle control unit is configured to acquire configuration information of each device corresponding to the device type from the host in response to the get device handle request and store the configuration information of each device into the configuration information management table.

10. The station according to claim 1, wherein
the device handle control unit is configured to receive, as the get device handle request, a command from the other device and transmit, as the get device handle response, a response to the command to the other device, and
the transaction relay unit is configured to relay a data transfer to and from the target device, a connection for the data transfer having been established with the other device by handshaking using the command and the response.

11. The station according to claim 10, wherein
all packets for each of the command, the response, and the data transfer include a tag ID for associating the command, the response, and the data transfer with one another, and
the device handle control unit is configured to receive, as the device handle number, the tag ID included in the command.

12. A target apparatus including the local bus, the host, and the station of claim 1, the target apparatus being for wirelessly communicating with an initiator apparatus including the other device, wherein
the host is configured to share the configuration information of the station with the station, the configuration information being for use in the communication via the local bus, and
each of the one or more of the devices includes a configuration information sharing unit configured to share with the host configuration information of respective devices of the one or more of the devices, each piece of configuration information being for use in the communication via the local bus.

13. A communication method of a station that is connected to a local bus and that is for relaying wireless communications transmitted to and from another device that is not connected to the local bus, the local bus being connected to a host, the method comprising:
   connecting, via a first transmission interface, to the local bus;
   connecting, wirelessly, via a second transmission interface, to the other device;
   sharing configuration information of the station with the host, the configuration information being for use in communication via the local bus;
   in response to a get device handle request received from the other device:
      acquiring configuration information of a target device from the host, the target device being connected to the local bus; and
      returning a get device handle response that is a response to the get device handle request to the other device, and thereby receiving a command transmission right from the host, the command transmission right being a right to transmit commands to the target device; and
   relaying a command received from the other device and a transaction specified by the command to the target device, wherein
   the local bus is part of a star-type of logical topology having the host at a center thereof, only the host initially having the command transmission right,
   the relaying of the transaction is carried out based on the configuration information of the target device acquired in the acquiring and without involvement of the host,
   the target device is a memory device,
   the transaction is one of a read transaction for reading data from the target device and a write transaction for writing data into the target device,
   the configuration information of the target device includes information indicating burst size relating to data transfer between the station and the target device,
   in the case where the transaction is the read transaction, receiving data from the target device, and each time receiving the data by the burst size from the target device, transmitting a reception result to the target device, and transmitting the data received from the target device to the other device via the second transmission interface, and
   in the case where the transaction is the write transaction, receiving data from the other device via the second transmission interface, and transmitting data received from the other device to the target device, and each time transmitting the data by the burst size to the target device, receiving a reception result from the target device.

* * * * *